（12） United States Patent
Tanaka

(10) Patent No.: US 9,973,880 B2
(45) Date of Patent: May 15, 2018

(54) COMMUNICATION DEVICE, INFORMATION DISPLAY DEVICE, COMMUNICATION METHOD AND STORAGE MEDIUM

(71) Applicant: CASIO COMPUTER CO., LTD., Shibuya-ku, Tokyo (JP)

(72) Inventor: Toshiaki Tanaka, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/442,400

(22) Filed: Feb. 24, 2017

(65) Prior Publication Data

US 2017/0280272 A1 Sep. 28, 2017

(30) Foreign Application Priority Data

Mar. 24, 2016 (JP) ................................ 2016-060091

(51) Int. Cl.

| | |
|---|---|
| *H04B 5/00* | (2006.01) |
| *H04W 4/00* | (2018.01) |
| *H04L 29/08* | (2006.01) |
| *H04M 1/02* | (2006.01) |
| *G09B 7/04* | (2006.01) |
| *H04W 88/02* | (2009.01) |

(52) U.S. Cl.
CPC .............. *H04W 4/005* (2013.01); *G09B 7/04* (2013.01); *H04L 67/26* (2013.01); *H04L 67/303* (2013.01); *H04M 1/0266* (2013.01); *H04W 4/008* (2013.01); *H04W 88/02* (2013.01)

(58) Field of Classification Search
CPC ..... H04W 4/005; H04W 4/008; H04W 88/02; G09B 7/04; H04L 67/26; H04L 67/303; H04M 1/0266
See application file for complete search history.

(56) References Cited

U.S. PATENT DOCUMENTS

2002/0013829 A1   1/2002   Kishimoto
2004/0193948 A1\*  9/2004   Ono ..................... G05B 19/058
                                                    714/6.11

(Continued)

FOREIGN PATENT DOCUMENTS

| JP | 2001350631 A | 12/2001 |
|---|---|---|
| JP | 2013025501 A | 2/2013 |
| JP | 5488104 B2 | 5/2014 |

OTHER PUBLICATIONS

Extended European Search Report (EESR) dated Aug. 9, 2017 issued in counterpart European Applicaiton No. 17158073.1.

*Primary Examiner* — Nguyen Vo
(74) *Attorney, Agent, or Firm* — Holtz, Holtz & Volek PC

(57) ABSTRACT

A communication device includes a wireless communication unit, a memory and a processor. The wireless communication unit is configured to perform wireless communication with an information display device. The processor is configured to perform operations including: receiving first work data including first setting data from the information display device having the first work data by the wireless communication unit; and registering the first work data as storage data in a case where the memory stores second work data including second setting data and in a case where the first setting data and the second setting data are different from each other.

11 Claims, 18 Drawing Sheets

(56) References Cited

U.S. PATENT DOCUMENTS

2006/0212546 A1 9/2006 Kishimoto
2006/0288300 A1 12/2006 Chambers et al.
2011/0246645 A1 10/2011 Martin et al.
2013/0239105 A1 9/2013 Kishimoto

* cited by examiner

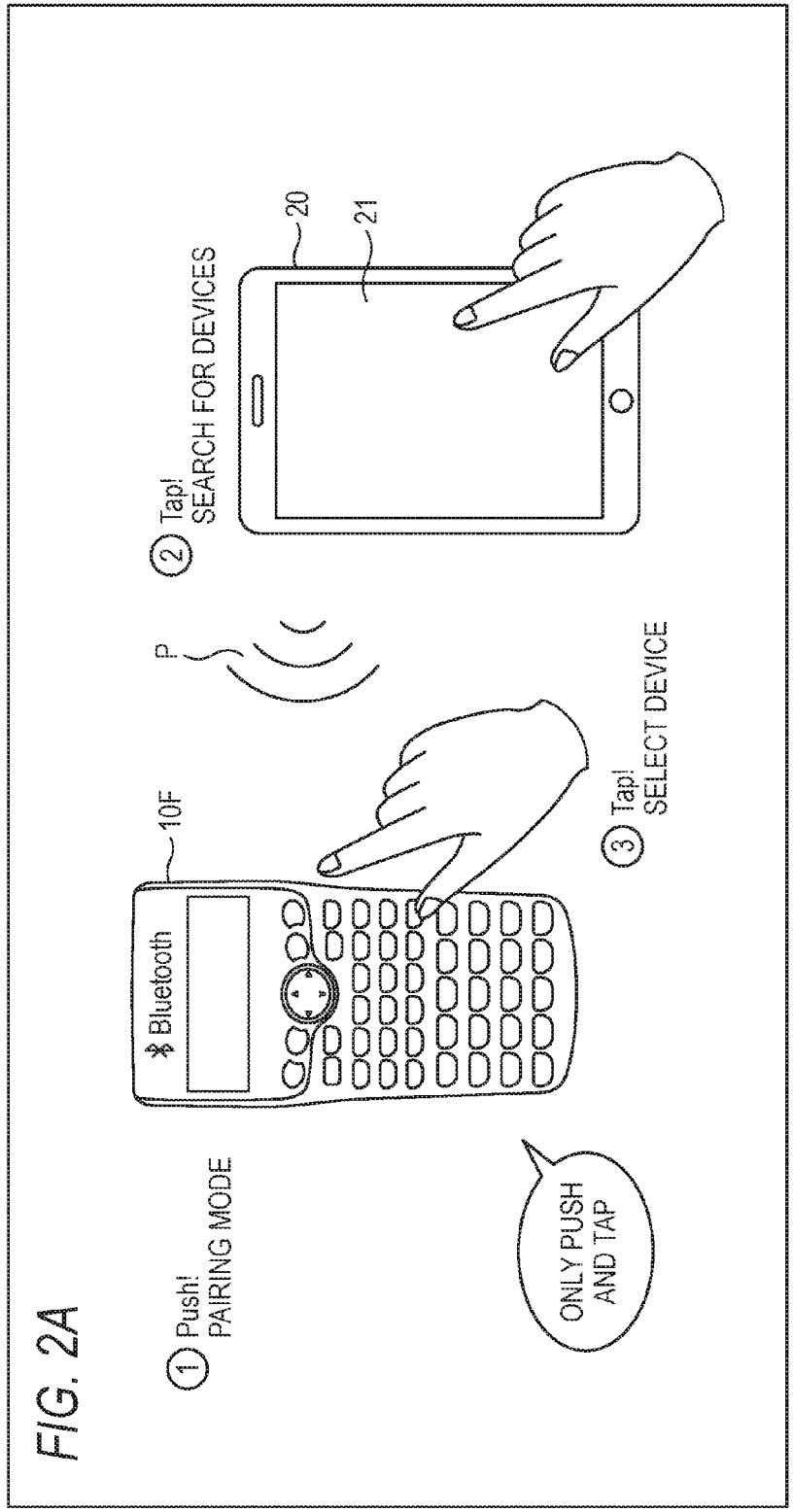

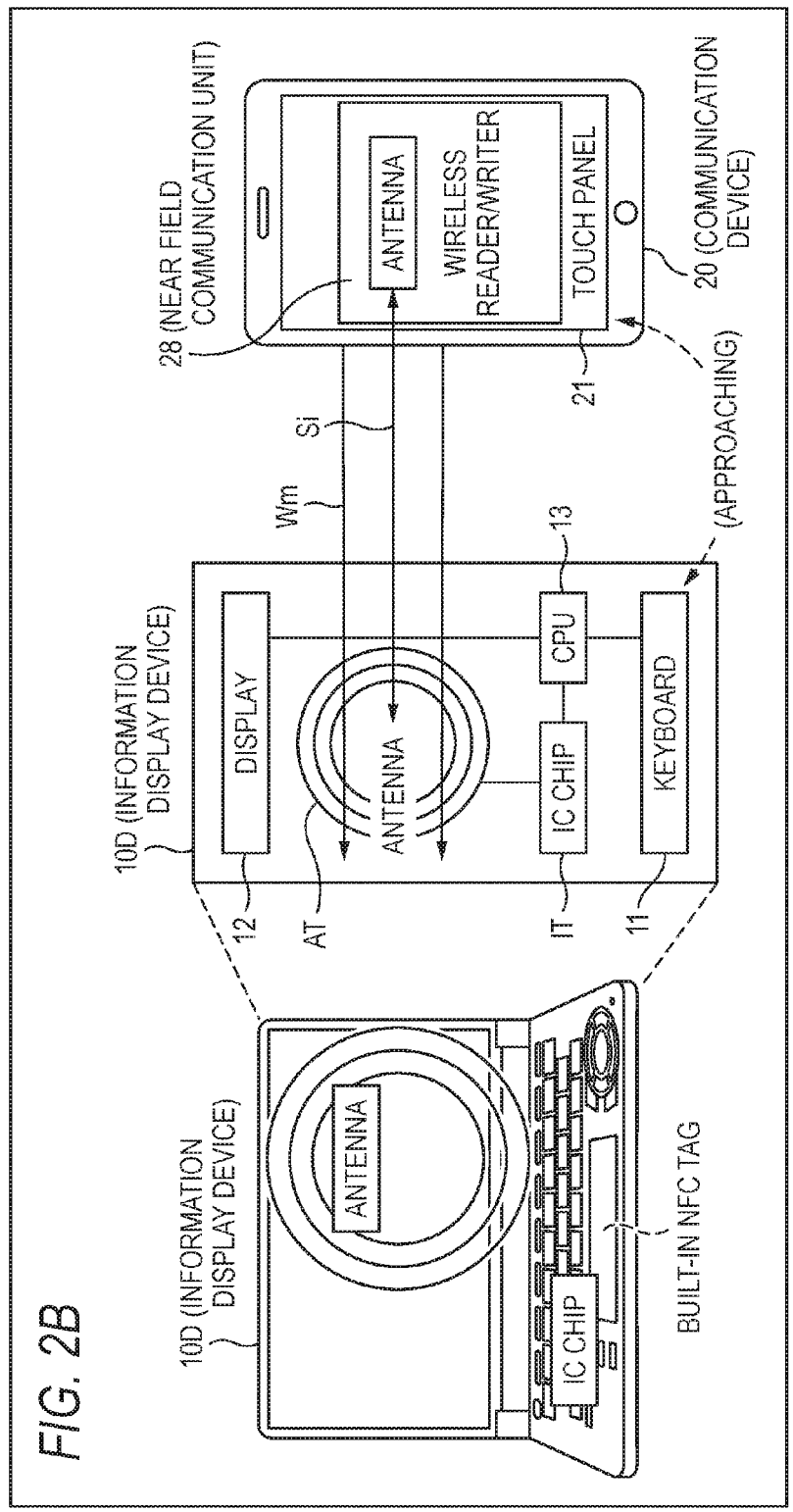

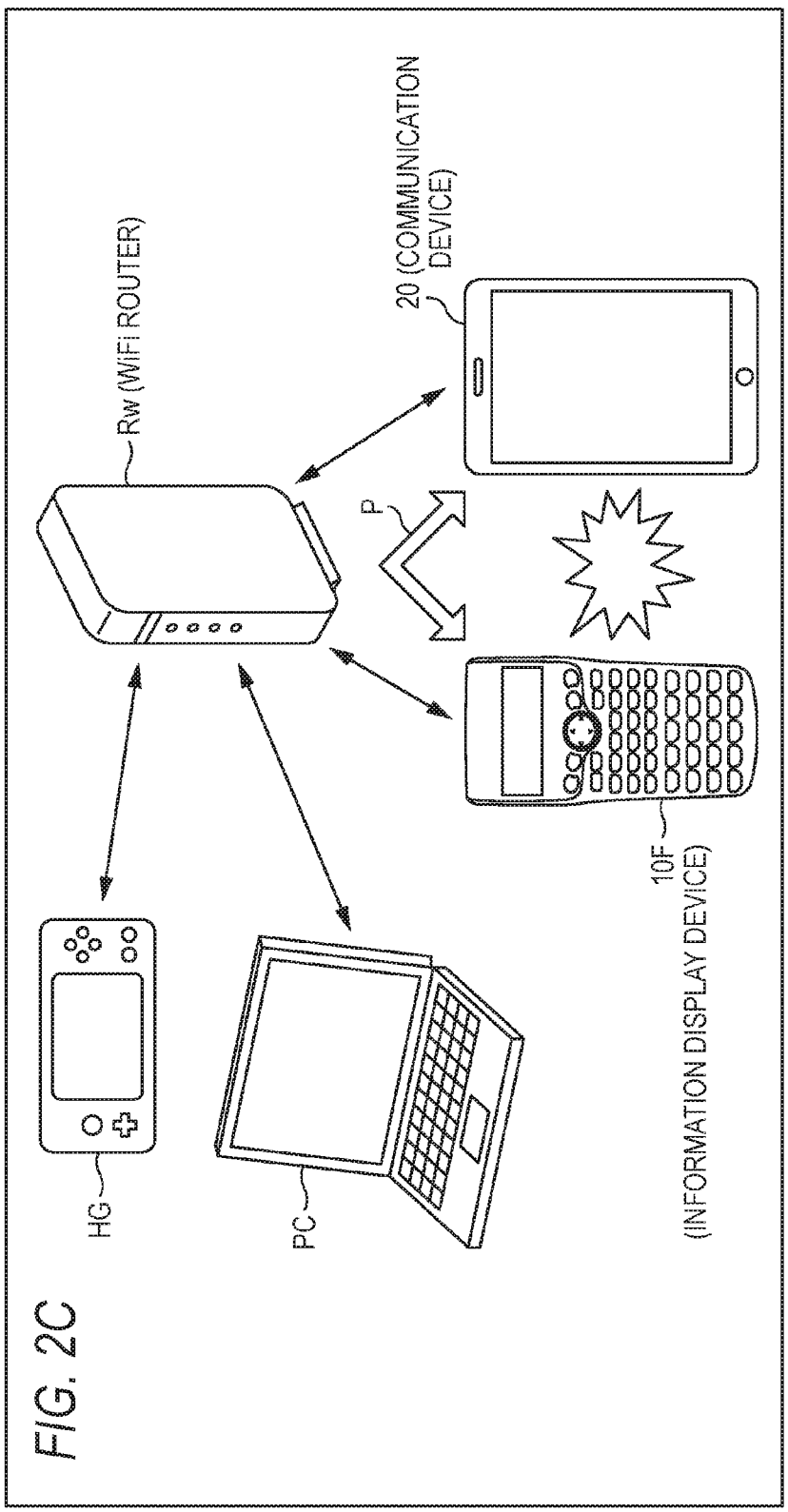

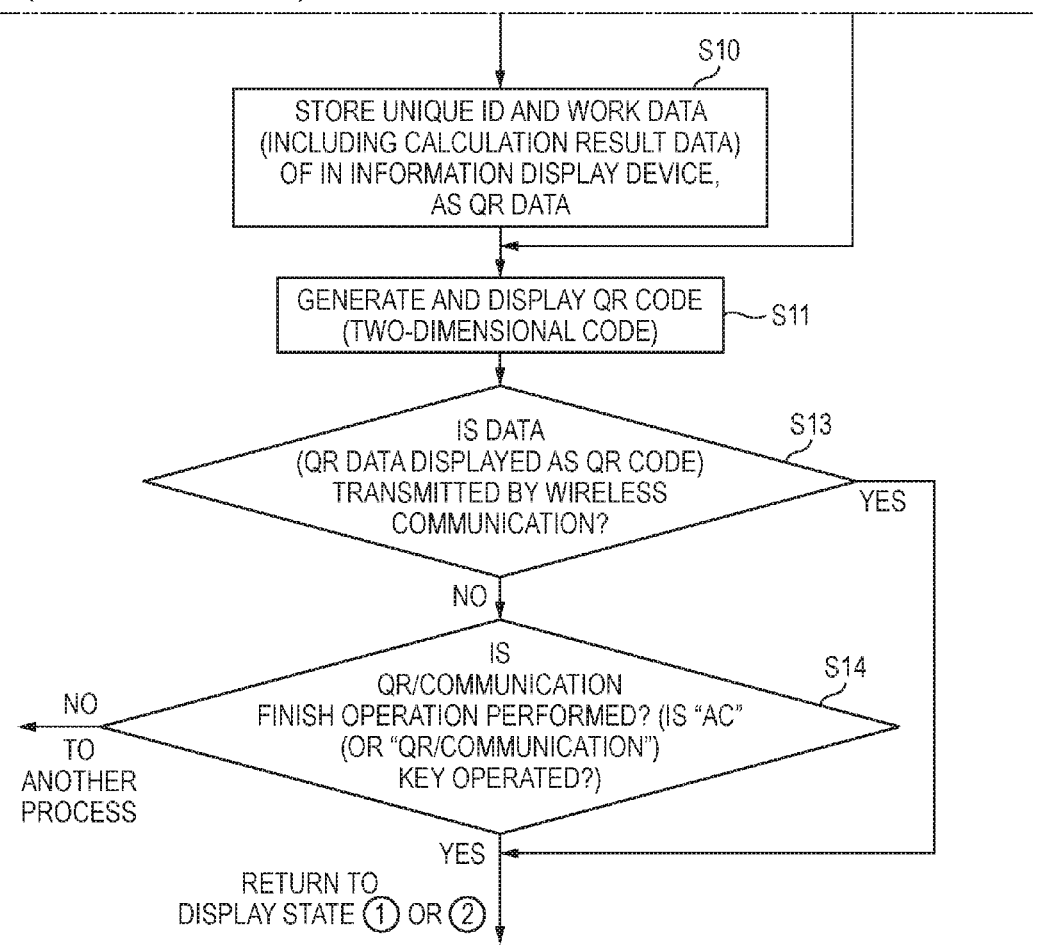

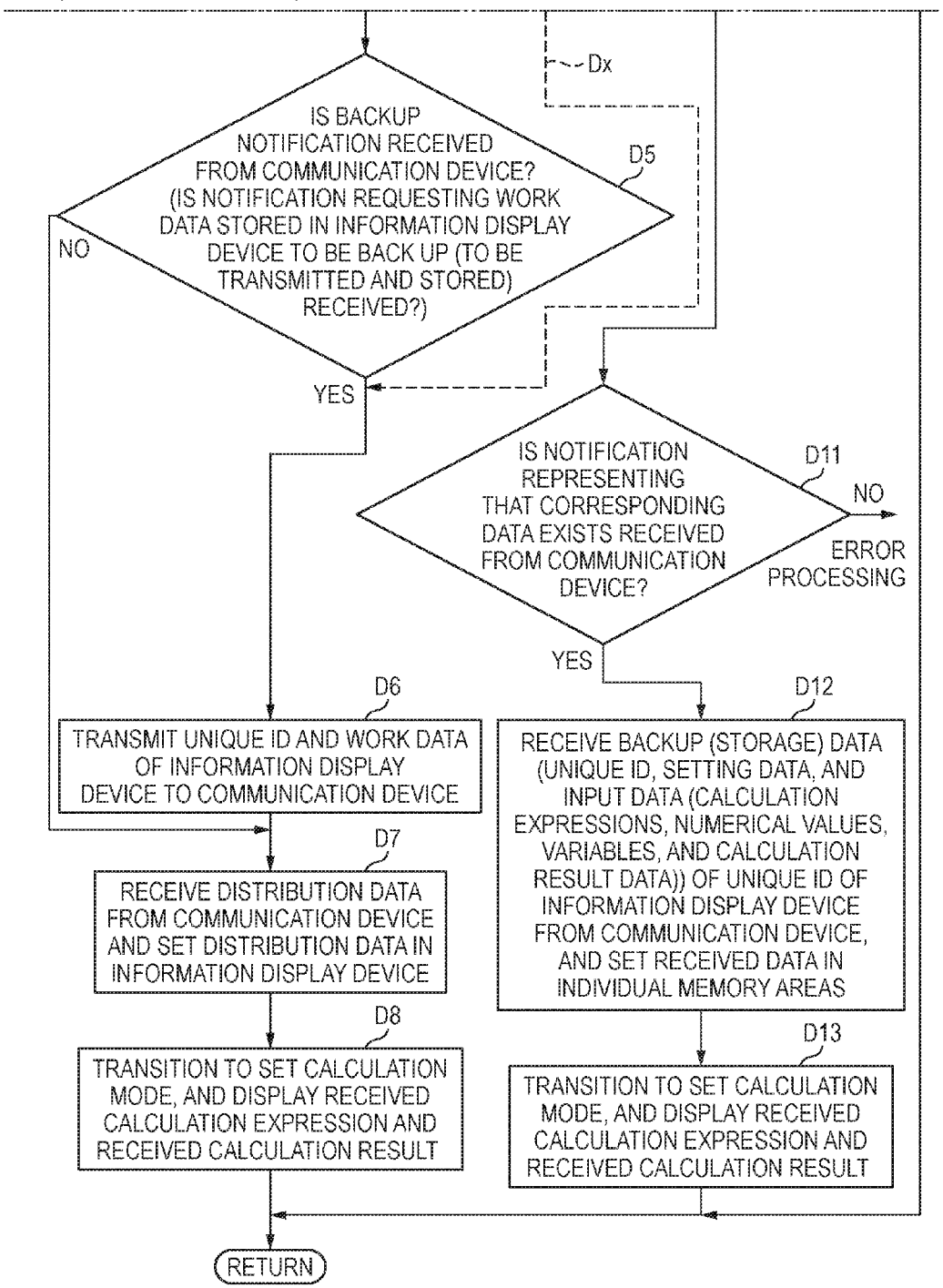

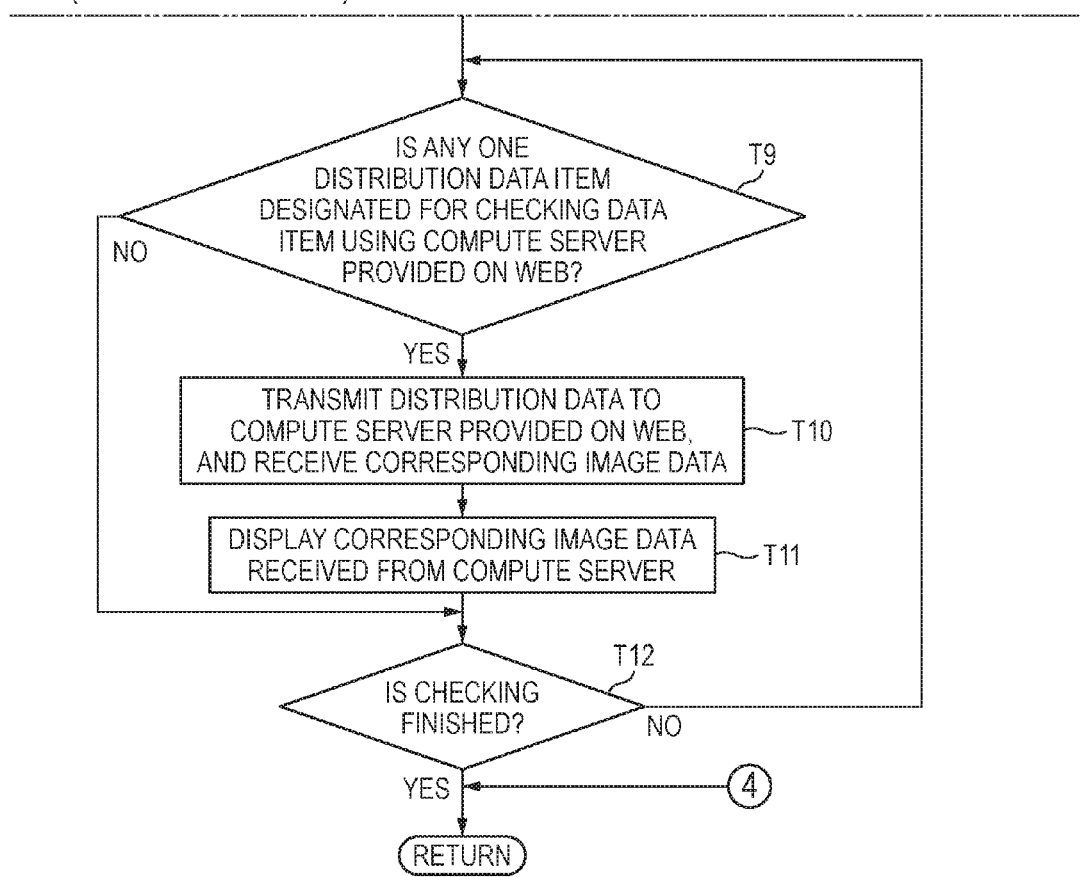

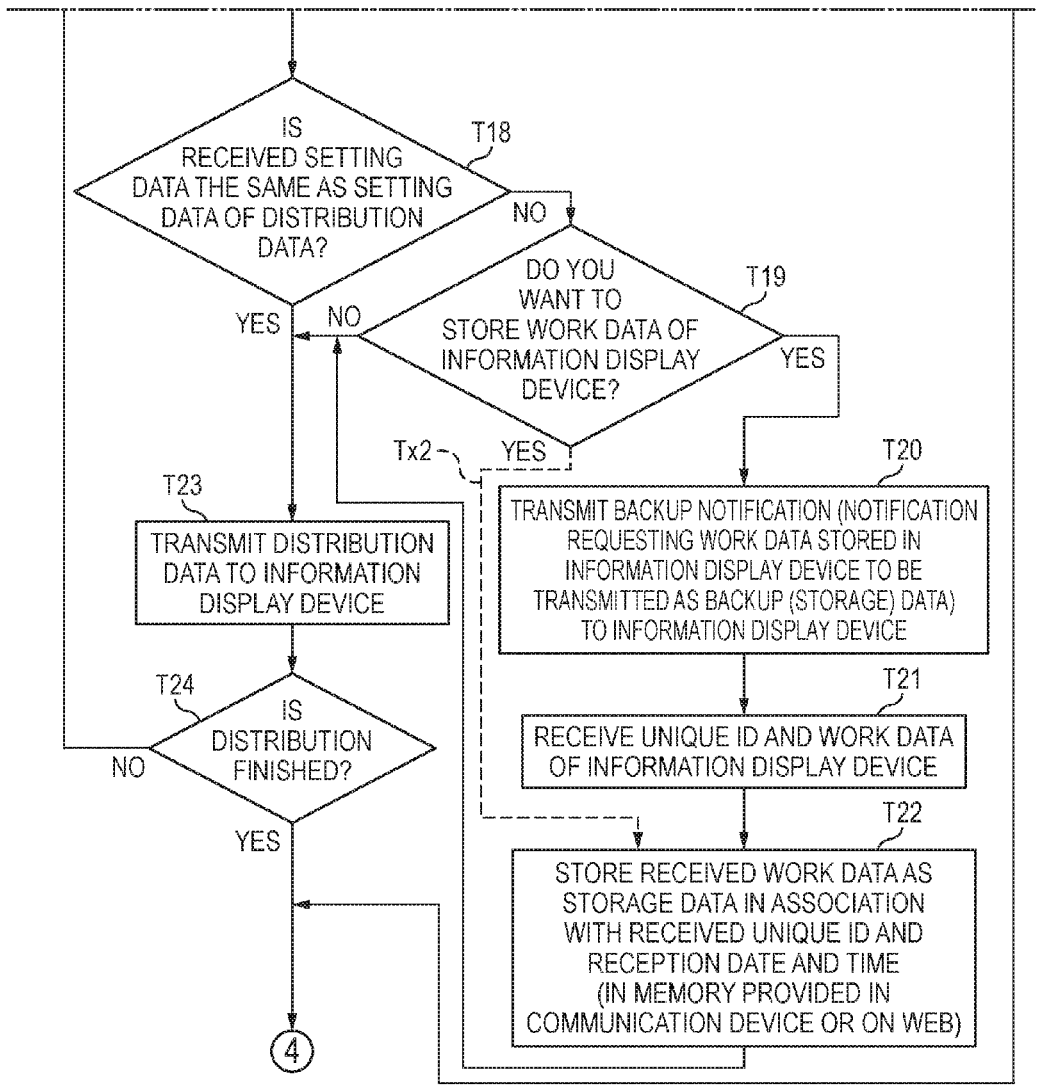

FIG. 9

SCIENTIFIC CALCULATOR (10FA) | COMMUNICATION DEVICE (20)

(A1) <OPERATE "SHIFT" KEY AND "SET UP" KEY AT THE SAME TIME>

1: INPUT/OUTPUT
2: ANGLE UNIT
3: NUMBER OF DIGITS FOR DISPLAY — Gm (12)
4: ENGINEERING SYMBOL DISPLAY (B1) <ACTIVATE DEDICATED COMMUNICATION APPLICATION>

— 20
EDUCATION+  — Ge (21)
Ce
QR Code >
□ □

(A2) <OPERATE "3" KEY TO DISPLAY SCREEN FOR SETTING NUMBER OF DIGITS FOR DISPLAY (ROUNDING MODE)>

<OPERATE "1" KEY TO SELECT "FIX" FOR SETTING NUMBER OF DECIMAL PLACES>

<OEPRATE "3" KEY TO SET "3" AS NUMBER OF DECIMAL PLACES>

1: "FIX" FOR SETTING NUMBER OF DECIMAL PLACES
2: "SCI" FOR SETTING NUMBER OF VALID DIGITS — Gk (12)
3: "NORM" FOR SETTING EXPONENTIAL DISPLAY RANGE
SELECT NUMBER OF DECIMAL PLACES FROM 0 TO 9

(A3) <SET NUMERICAL TABLE CALCULATION MODE AS CALCULATION MODE>
<INPUT EXPRESSION OF FUNCTION f(x)>

D  FIX  — 12
f(x) = sin(x)

(CONT.)

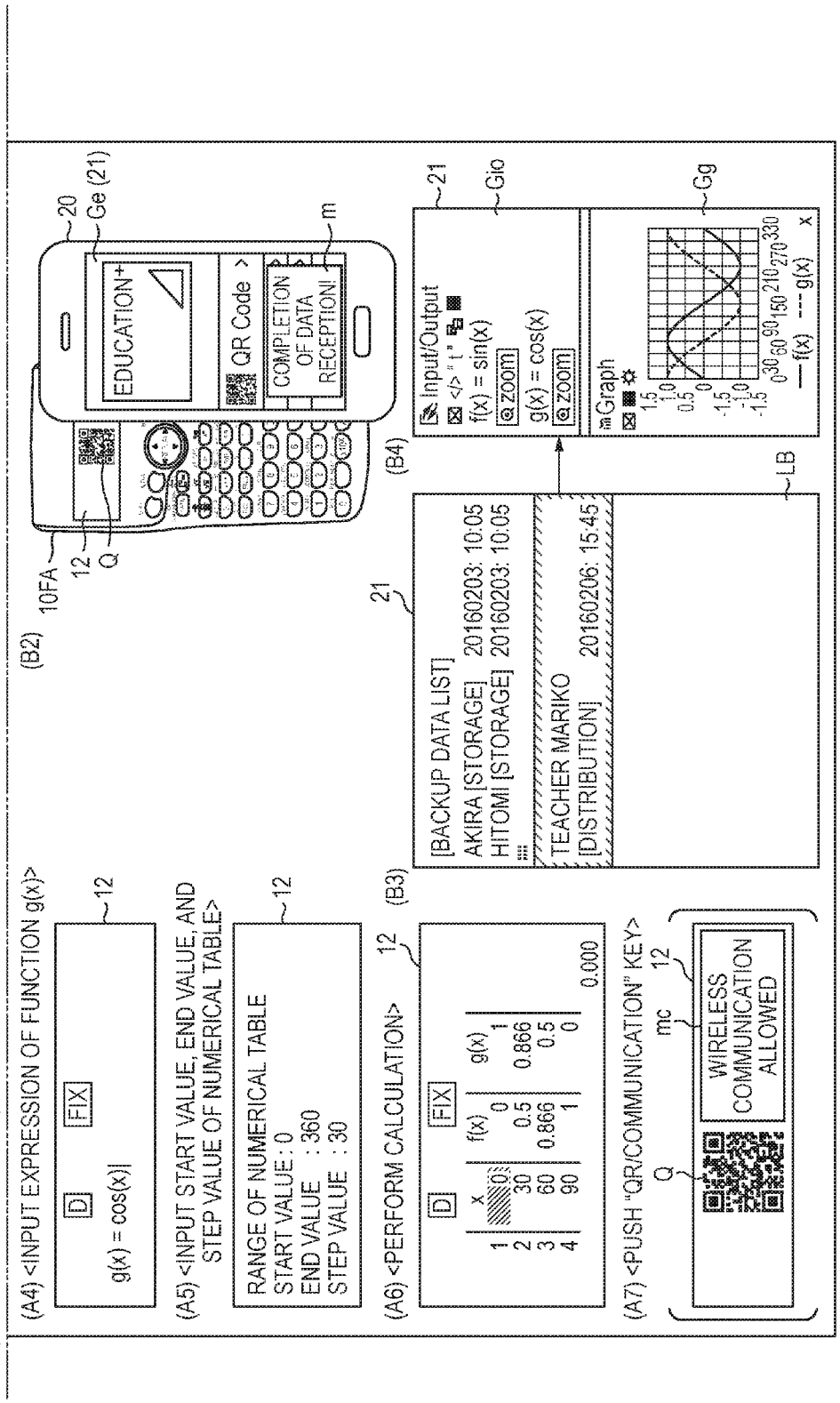

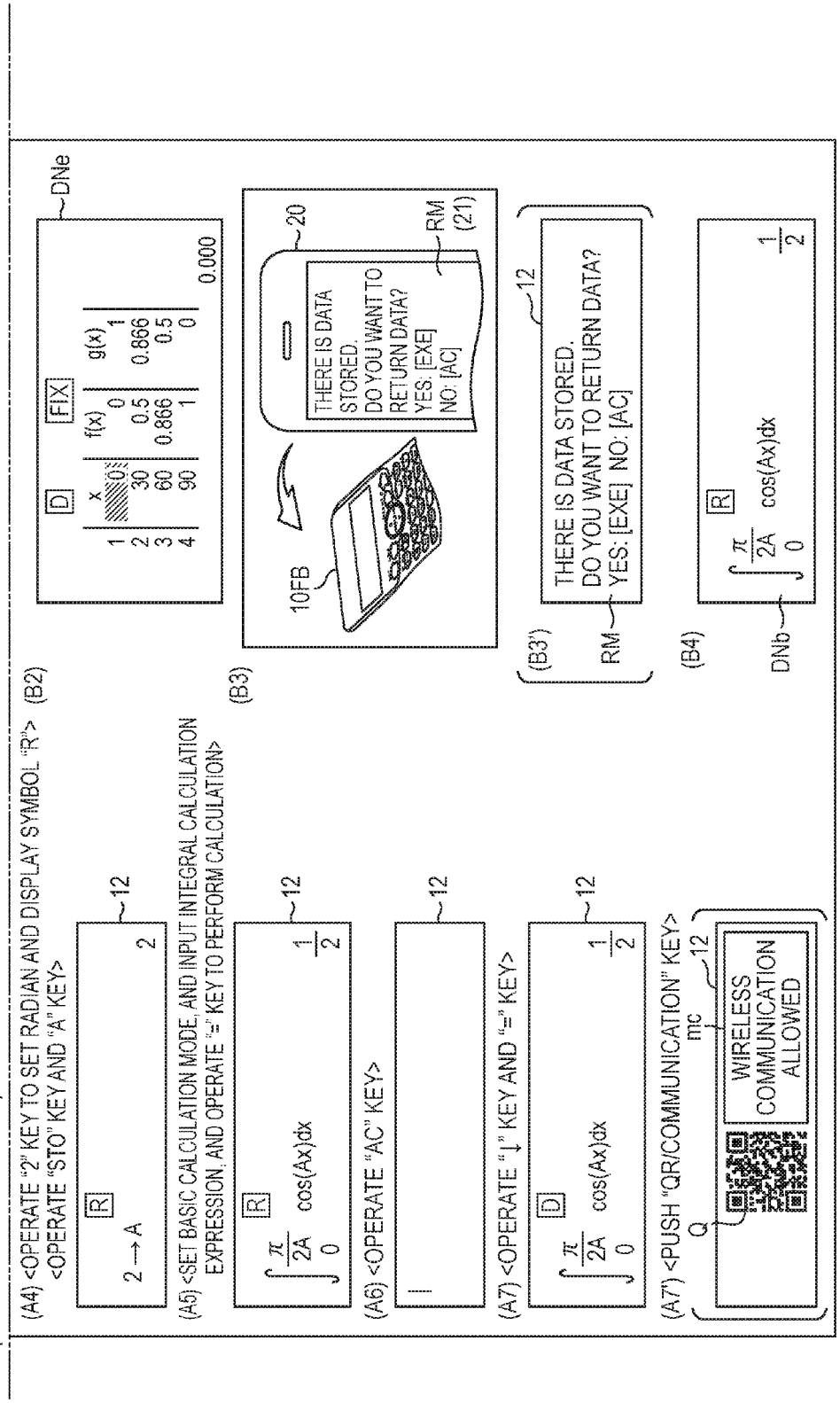

… (1)

COMMUNICATION DEVICE, INFORMATION DISPLAY DEVICE, COMMUNICATION METHOD AND STORAGE MEDIUM

CROSS-REFERENCE TO RELATED APPLICATIONS

This application is based upon and claims the benefit of priority from the prior Japanese Patent Application No. 2016-060091, filed on Mar. 24, 2016, and the entire contents of which are incorporated herein by reference.

BACKGROUND OF THE INVENTION

1. Field of the Invention

The present invention relates to a communication device, an information display device and a communication method and a storage medium having a program for downloading work data to the information display device.

2. Description of the Related Art

In the related art, there has been implemented a system in which a teacher appropriately inputs data on desired educational content to an information display device such as a graphing calculator having relatively large memory, thereby saving the educational content data as work data, and backs up the work data to a personal computer (PC), and students download the work data backed up to the PC with their graphing calculators and use the work data.

In a case where an electronic device (scientific calculator) of the related art has a RAM retaining a data group processable in the electronic device, if a communication connection is established between the electronic device and an external device (a general-purpose PC), the electronic device converts the data group into a file processable in the external device, and stores the file in a storage. Thereafter, if the communication connection is cut off, the electronic device converts the file stored in the storage into the data group, and stores the data group in the RAM. A technology for making it possible to easily process information which is handled in an electronic device in an external device as described above has been considered (see JP-B-5488104 for instance).

In information display devices such as graphing calculators having relatively large memories, it is also possible to read and use work data while keeping other input work data.

However, in some types of information display devices having limited memories, unless input work data is deleted, it is not possible to store and use other work data.

The present invention was made in view of the above-described problem, and an object of the present invention is to provide a communication device, an information display device, a communication method, and so on for making it possible for the information display device to appropriately store input work data and use new work data even if the information display device has limited memory.

SUMMARY OF THE INVENTION

According to one aspect of the disclosure, a communication device includes a wireless communication unit, a memory and a processor. The wireless communication unit is configured to perform wireless communication with an information display device. The processor is configured to perform operations including: receiving first work data including first setting data from the information display device having the first work data by the wireless communication unit; and registering the first work data as storage data in a case where the memory stores second work data including second setting data and in a case where the first setting data and the second setting data are different from each other.

According to another aspect of the disclosure, an information display device includes a wireless communication unit, a memory and a processor. The wireless communication unit is configured to perform wireless communication with a communication device. The memory stores first work data including first setting data. The processor is configured to perform operations including: receiving a transmission notification as a notification representing that the communication device having second work data including second setting data transmits the second work data, by the wireless communication unit; and transmitting the first work data stored in the memory to the communication device, according to the received transmission notification, in a case where the first setting data included in the first work data and the second setting data included in the second work data are different from each other.

BRIEF DESCRIPTION OF THE DRAWINGS

FIGS. 2A to 2C are views illustrating examples of a wireless communication unit which is used between the information display device (10F or 10D) and the communication device 20.

FIG. 9 is a view illustrating operation states of the scientific calculator 10F (a scientific calculator 10FA for a teacher) and operation states of the tablet terminal 20 according to the information display control process when the scientific calculator is in a numerical table calculation mode.

DETAILED DESCRIPTION OF THE INVENTION

Hereinafter, embodiments of the present invention will be described with reference to the accompanying drawings.

Figure 1:
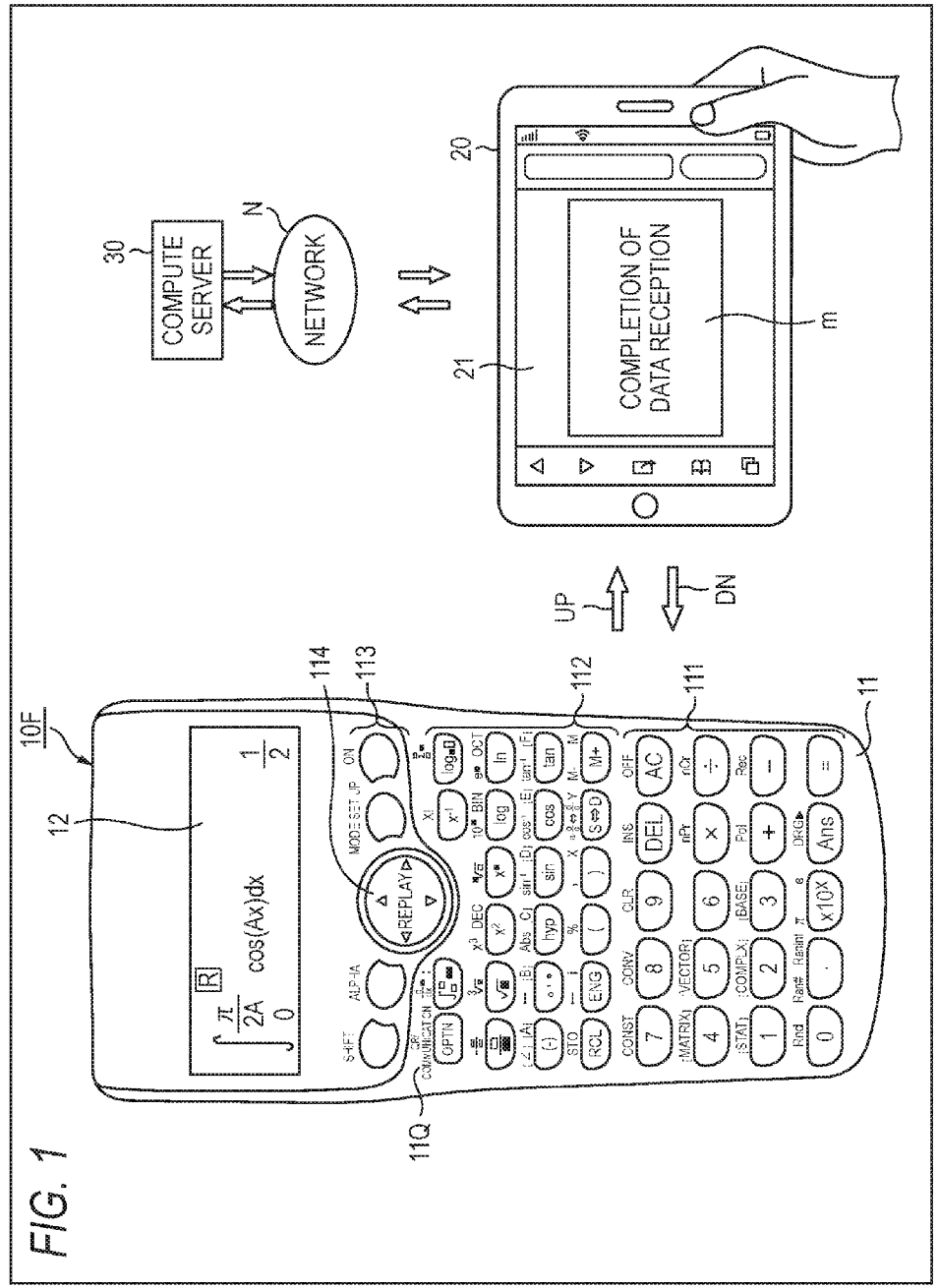
FIG. 1 is a schematic diagram illustrating a utilization form of a scientific calculator 10F and a tablet terminal 20 which are an information display device and a communication device according to an embodiment of the present invention, respectively.

FIG. 1 is a schematic diagram illustrating a utilization form of a scientific calculator 10F and a tablet terminal 20 which are an information display device and a communication device according to an embodiment of the present invention, respectively.

The scientific calculator 10F is configured in a small size due to the necessity of portability such that a user can sufficiently grip it with one hand and operate it with one hand. On the front surface of the main body of the scientific calculator 10F, a key input unit 11 and a display output unit 12 are provided.

The key input unit 11 includes a numerical-value/operation-symbol key group 111 for inputting numerical values or mathematical expressions, or issuing a calculation performance instruction, an arithmetic-function/function key group 112 for inputting various arithmetic functions or starting a memory function, a mode setting key group 113 for displaying a menu screen of various operating modes or issuing an operating-mode setting instruction, and a cursor key 114 for performing various operations such as an operation to move a cursor displayed on the display output unit 12 and an operation to select a data item.

As the number/operation-symbol key group 111, "0" to "9" (numeric) keys, "+", "−", "×", and "÷" (four basic operation symbols) keys, "Ans" and "=" (execution) keys, "AC" (clear) key, and so on are arranged.

As the arithmetic-function/function key group 112, an "$x^{-1}$" (x to the negative one power; the reciprocal of x) key, a "$\sqrt{\square}$" (root) key, a "$\square/\square$" (fraction) key, a "sin" (sine) key, an "M+" (memory plus) key, an "OPTN" (option) key, a "RCL" (memory call) key, and so on are arranged.

As the mode setting key group 113, a "MODE" (mode) key, a "SHIFT" (shift) key, an "ALPHA" (alphabet) key, an "ON" (power-on) key, and so on are arranged.

Also, each key of the number/operation-symbol key group 111 and the arithmetic-function/function key group 112 is configured so as to be able to act as a key for a function written above the corresponding key, not a function written on the corresponding key, if the corresponding key is operated after the "SHIFT" key is operated. For example, an operation on the "AC" key after an operation on the "SHIFT" key (hereinafter referred to as a "SHIFT"+"AC" key or the like.) acts as an "OFF" (power-off) key. A "SHIFT"+"OPTN" key acts as the "QR/communication" key 11Q, and a "SHIFT"+"RCL" key acts as a "STO" (memory registration) key.

The display output unit 12 is composed of a dot matrix type liquid crystal display unit.

The tablet terminal 20 is a tablet terminal 20 with a camera, and includes a display output unit 21 which also acts as a touch input unit.

The scientific calculator 10F includes a wireless communication unit, and has an uploading (UP) function of transmitting work data of the scientific calculator 10F to the tablet terminal 20 in response to an instruction from the tablet terminal 20, and a downloading (DN) function of receiving work data from the tablet terminal 20.

The work data includes setting data including data on a calculation mode, an angle mode, and a rounding mode set on the basis of a calculation function of the scientific calculator 10F, and input data such as calculation expressions and numerical values (tables) input by user's operations.

Also, the scientific calculator 10F has a function of converting the work data into a two-dimensional code (QR code) Q (see FIG. 3) and displaying the two-dimensional code, in response to an operation on the "QR/communication" key 11Q, and a function of setting the work data displayed as the two-dimensional code Q as communication data of the wireless communication unit.

The tablet terminal 20 has a wireless communication unit, and has a function of receiving work data from the scientific calculator 10F (uploading (UP) of the scientific calculator) and storing the work data as a distribution data item or a storage data item, and a function of transmitting the work data stored as the distribution data item or the storage data item to the scientific calculator 10F (downloading (DN) of the scientific calculator).

If all of work data transmitted from the scientific calculator 10F is received (uploading is completed), the tablet terminal 20 displays a reception completion message m on the display output unit 21.

Also, the tablet terminal 20 has a function of acquiring an image of a two-dimensional code (QR code) Q (see FIG. 4) displayed on the scientific calculator 10F, and storing work data corresponding to the two-dimensional code as a distribution data item or a storage data item.

Further, the tablet terminal 20 has a function of transmitting the stored work data to a compute server 30 provided on a communication network (Web) N, and receiving image data generated as calculation reference information on the basis of the work data by the compute server 30, and displaying the image data.

Also, the information display device is not limited to the scientific calculator 10F, and can be configured as an electronic dictionary device 10D (see FIG. 2B) or the like.

Work data of the electronic dictionary device 10D includes setting data including data on the retrieval mode of the electronic dictionary device 10D (such as an English-Japanese retrieval mode, a Japanese-English retrieval mode, an English-English retrieval mode, or a jump retrieval mode), and input data such as dictionaries and search terms input by user's operations.

Also, the communication device is not limited to the tablet terminal 20, and can be configured as a personal digital assistant (PDA), a smart phone, a note personal computer (PC), a game console, or the like.

Now, the wireless communication unit for establishing a communication connection between the scientific calculator 10F or the electronic dictionary device 10D which is the information display device and the communication device 20 will be described.

FIGS. 2A to 2C are views illustrating examples of the wireless communication unit which is used between the information display device (10F or 10D) and the communication device 20.

As the wireless communication unit, any one of near field communication such as Bluetooth (registered as a trade mark) as shown in FIG. 2A, near field communication such as NFC as shown in FIG. 2B, near field communication using a wireless LAN such as WiFi (registered as a trade mark) as shown in FIG. 2C, and other types of near field communication may be used.

In a case of using near field communication such as Bluetooth as shown in FIG. 2A, if a predetermined key (button) of the information display device (10F) is pushed, interrogation is performed on the communication device 20 existing around the information display device, in a wireless manner. Then, the communication device displays a list of partner devices capable of communication and including the information display device (10F). If the information display device (10F) is designated (tapped) from the displayed partner device list, the information display device (10F) and the communication device 20 are paired such that a communication connection P is established between them.

Also, near field communication such as NFC shown in FIG. 2B is a wireless communication unit for performing wireless communication by an induced current caused by a magnetic field from the communication device 20.

For example, an NFC tag built in the information display device (the electronic dictionary device 10D) includes a coil antenna AT in which an induced current flows in response to a magnetic field Wm which is generated from a near field communication unit (a wireless reader/writer) 28 of the communication device 20, and an IC chip IT which uses the induced current flowing in the coil antenna AT as electromotive force to operate. A CPU 13 of the information display device (the electronic dictionary device 10D) is connected to the IC chip IT of the NFC tag by wires, and has a wire reader/writer function capable of directly reading and writing data from and in the IC chip IT. In this case, between the NFC tag of the information display device (the electronic dictionary device 10D) and the near field communication unit (the wireless reader/writer) 28 of the communication device 20, wireless communication Si is performed.

Also, in a case of using near field communication using a wireless LAN such as WiFi shown in FIG. 2C, for example, from among individual communication devices (such as the information display device 10F, the communication device 20, a personal computer PC, and a game console HG) connected to the wireless LAN by a WiFi router Rw, only preset partner communication devices are paired such that a communication connection P is established between them. In this case, if the partner communication devices detect an impact such as a light touch with each other, the partner communication devices are paired such that a communication connection P is established between them.

Figure 3:
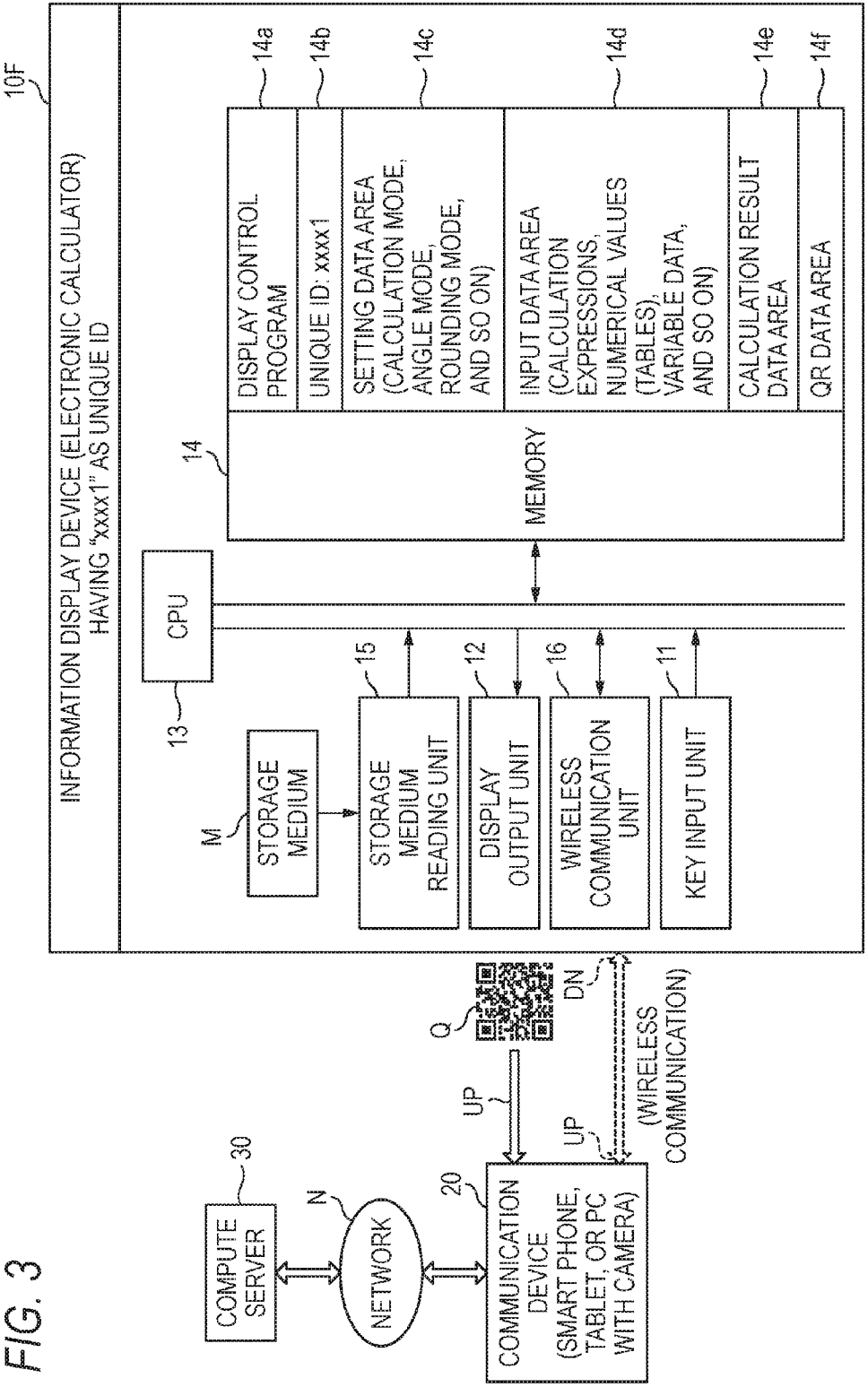
FIG. 3 is a block diagram illustrating electronic circuit components of the scientific calculator 10F which is the information display device.

FIG. 3 is a block diagram illustrating electronic circuit components of the scientific calculator 10F which is the information display device.

However, since some parts of electronic circuits of the electronic dictionary device 10D which is the information display device related to the present embodiment is substantially the same as those of the electronic circuits of the scientific calculator 10F, they will not be described.

The electronic circuits of the scientific calculator 10F include the CPU 13 which is a computer, a memory 14, a storage medium reading unit 15, and a wireless communication unit 16, in addition to the key input unit 11 and the display output unit 12.

The CPU 13 controls operations of the individual circuit units according to a display control program 14*a* stored in the memory 14, thereby performing various calculation processes based on key input signals from the key input unit 11. The display control program 14*a* may be stored in the memory 14 in advance, or may be a program downloaded from an external storage medium M such as a memory card to the memory 14 by the storage medium reading unit 13. Even if the user operates the key input unit 11, the display control program 14*a* is not rewritten.

In the memory 14, a unique ID 14*b* is also stored as information which the user cannot rewrite. The unique ID 14*b* is an ID (identification information) unique to the scientific calculator 10F.

The memory 14 has a setting data area 14*c*, an input data area 14*d*, a calculation result data area 14*e*, and a QR data area 14*f* for storing data which the user cannot rewrite, other than the above-described information which the user cannot rewrite.

In the setting data area 14*c*, setting data including data on a calculation mode (such as a basic calculation mode, a numerical table calculation mode, a matrix calculation mode, or a statistical calculation mode), an angle mode (such as "D" (Degree), "R" (Radian), or "G" (Gradient), a rounding mode (a "Fix" mode in which the number of decimal places is fixed, or a "Sci" mode in which the number of significant digits is fixed), and a display mode (such as a mathematical natural display mode or a linear display mode) is stored.

If key code data are sequentially input by the key input unit 11, data on a calculation expression, numerical values (a table), variables, and the like which can be created by the key code data is stored in the input data area 14*d*. For example, numeric keys are stored as codes representing numbers, and function keys such as a "sin" key are stored as codes representing corresponding functions, and operation symbol keys such as the "+", "−", "x", and "÷" keys are stored as codes representing corresponding operation symbols. Also, in the input data area 14*d*, variables such as different numerical values which can be individually registered for nine characters A, B, C, D, E, F, M, X, and Y are also stored. For example, if a "3" key, the "SHIFT"+"RCL" key (the "STO" key), and a "(−)" key (an "A" key) are operated, a numerical value "3" is registered as the variable "A".

In the calculation result data area 14*e*, calculation result data obtained by performing calculations on the basis of the setting data and input data is stored.

Work data of the scientific calculator 10F including setting data and input data (if there is calculation result data, the calculation result data is also included in the work data) is converted into a two-dimensional code (QR code) Q in response to an operation on the "QR/communication" key 11Q, and data (QR data) on the corresponding two-dimensional code Q is stored in the QR data area 14*f*.

The wireless communication unit 16 has a function of performing wireless communication with the communication device 20 by Bluetooth, NFC, or WiFi as described above with reference to FIGS. 2A to 2C.

In the scientific calculator 10F configured as the information display device as described above, the CPU 13 controls the operations of the individual circuit units according to commands described in the display control program 14*a*, whereby their software and hardware operate in cooperation, thereby implementing the uploading (UP) function of transmitting work data to the communication device 20 and the downloading (DN) function of receiving work data from the communication device 20, as will be described in the following description of operations.

The communication device 20 establishes a communication connection with the wireless communication unit 16 of the scientific calculator 10F by near field communication, and receives the work data from the scientific calculator 10F and stores the work data (uploading (UP) of the scientific calculator). However, the communication device may acquire an image of a two-dimensional code Q displayed on the display output unit 12 of the scientific calculator 10F, thereby acquiring work data of the scientific calculator 10F, and store the work data.

Figure 4:
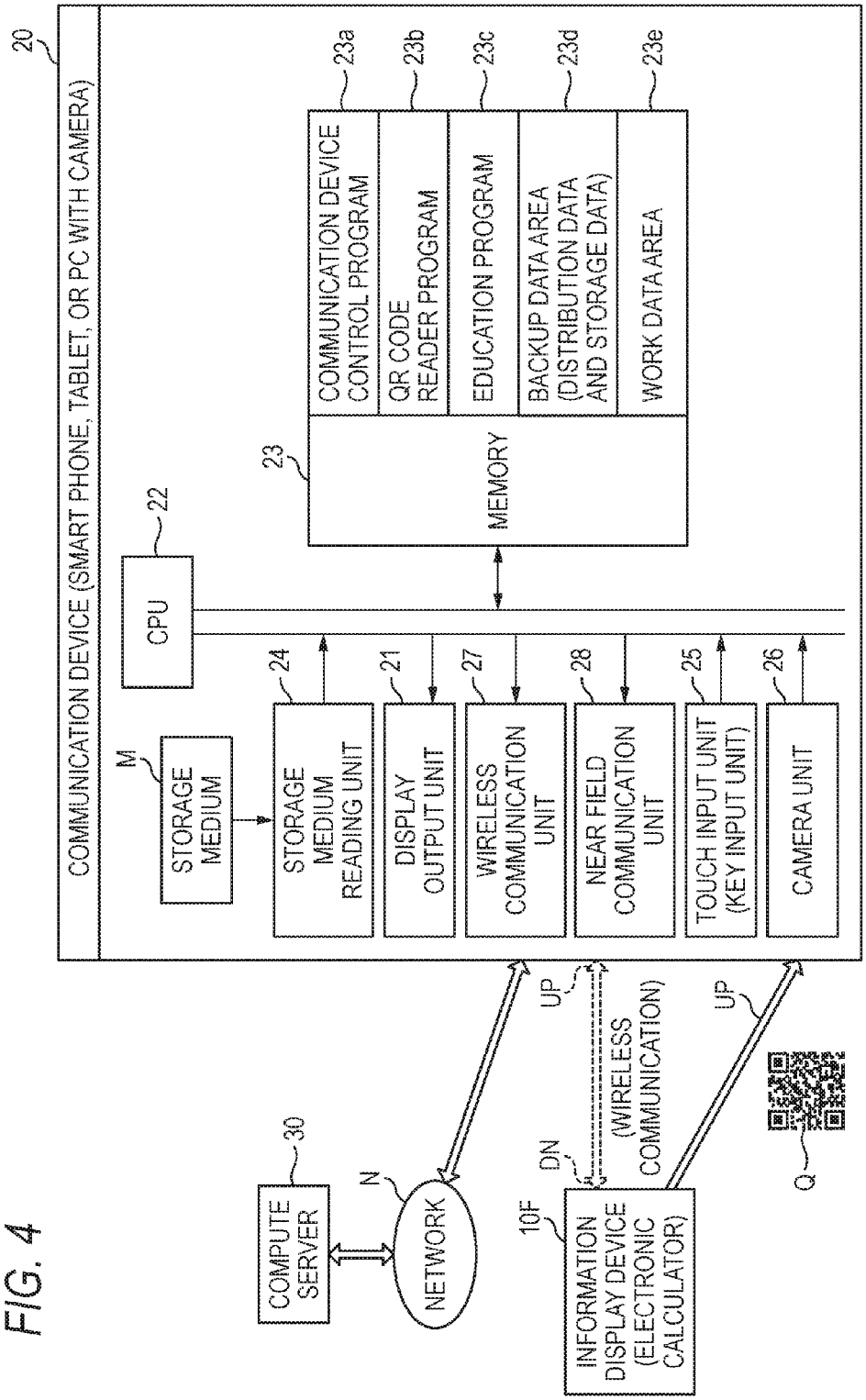
FIG. 4 is a block diagram illustrating electronic circuit components of the communication device 20.

FIG. 4 is a block diagram illustrating electronic circuit components of the communication device 20.

The electronic circuits of the communication device 20 include a CPU 22 which is a computer, a memory 23, a storage medium reading unit 24, a touch input unit 25 integrally provided on the display output unit 21, a camera unit 26, and a wireless communication unit 27, in addition to the display output unit 21 and the near field communication unit 28. Also, the touch input unit 25 may include a key input unit such as a power key.

The CPU 22 controls operations of the individual circuit units according to a communication device control program 23a, a QR code reader program 23b, and an education program 23c stored in the memory 23, in response to touch (or key) input signals from the touch input unit 25, or signals received by the wireless communication unit 27 or the near field communication unit 28. The individual programs 23a, 23b, and 23c may be stored in the memory 23 in advance, or may be programs downloaded from an external storage medium M such as a memory card to the memory 23 by the storage medium reading unit 24.

The QR code reader program 23b is a general-purpose application program for acquiring an image of a two-dimensional code Q (a QR code in the present embodiment) and acquiring data (QR data which is work data in the present embodiment) on the image of the two-dimensional code Q.

The education program 23c is a dedicated application program for establishing a communication connection with the scientific calculator 10F by the near field communication unit 28, and receiving work data from the scientific calculator 10F, and storing the received work data as distribution data items or storage data items (uploading (UP) of the scientific calculator), or transmitting stored work data to the scientific calculator 10F (downloading (DN) of the scientific calculator), and establishing a communication connection with the compute server 30 by the wireless communication unit 27, and transmitting stored work data to the compute server 30, and receiving image data generated as calculation reference information on the basis of the transmitted work data by the compute server 30, and displaying the image data.

The memory 23 has a backup data area 23d for storing and holding work data uploaded from the scientific calculator 10F, as distribution data items or storage data items, according to the education program 23c, in association with the user name and unique ID of the scientific calculator 10F, and a work data area 23e for temporarily storing other work data if necessary.

In the communication device 20 configured as described above, the CPU 22 controls the operations of the individual circuit units according to commands described in the communication device control program 23a, the QR code reader program 23b, and the education program 23c, whereby their software and hardware operate in cooperation, thereby implementing a function of receiving work data from the scientific calculator 10F and storing the work data as distribution data items or storage data items (uploading (UP) of the scientific calculator), and a function of transmitting work data stored as distribution data items or storage data items to the scientific calculator 10F (downloading (DN) of the scientific calculator).

Now, the operations of the scientific calculator 10F and the tablet terminal 20 configured as the information display device and the communication device will be described.

Figure 5:
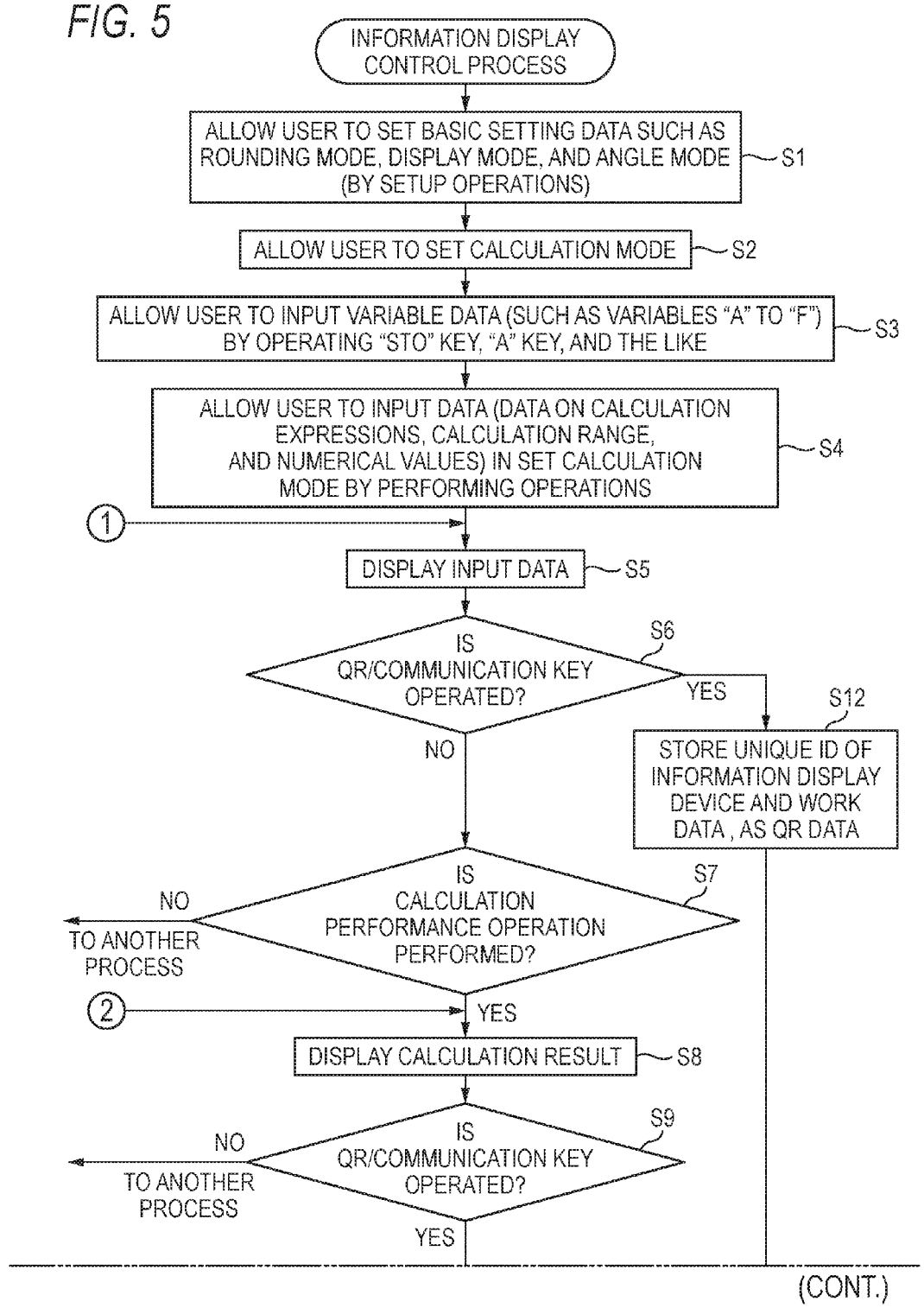
FIG. 5 is a flow chart illustrating an information display control process of the scientific calculator 10F.

FIG. 5 is a flow chart illustrating the information display control process of the scientific calculator 10F.

Figure 6:
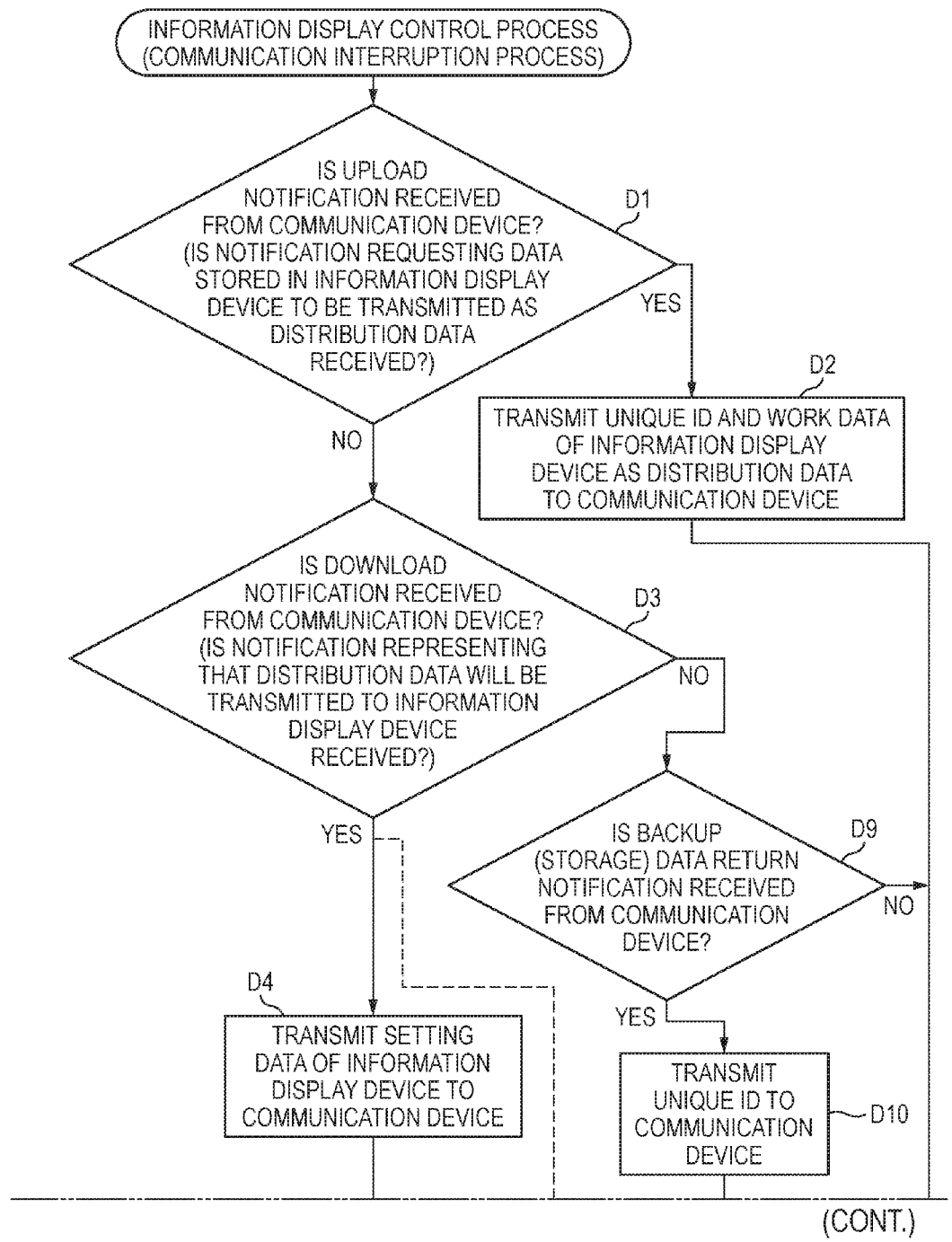
FIG. 6 is a flow chart illustrating a communication interruption process related to the information display control process of the scientific calculator 10F.

FIG. 6 is a flow chart illustrating a communication interruption process related to the information display control process of the scientific calculator 10F.

Figure 7:
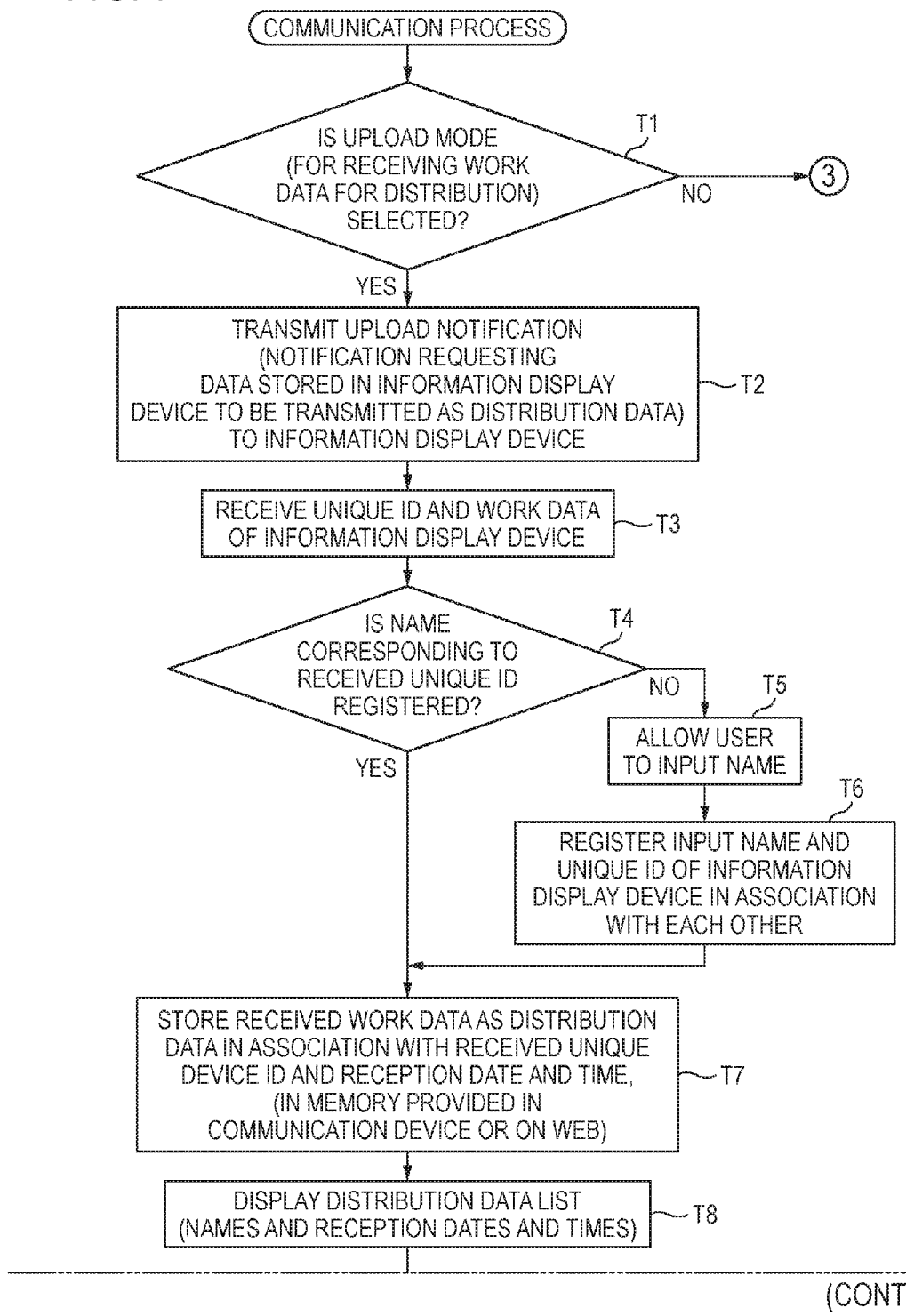
FIG. 7 is a flow chart illustrating a part of a communication process according to a dedicated application program of a tablet terminal 20.
Figure 8:
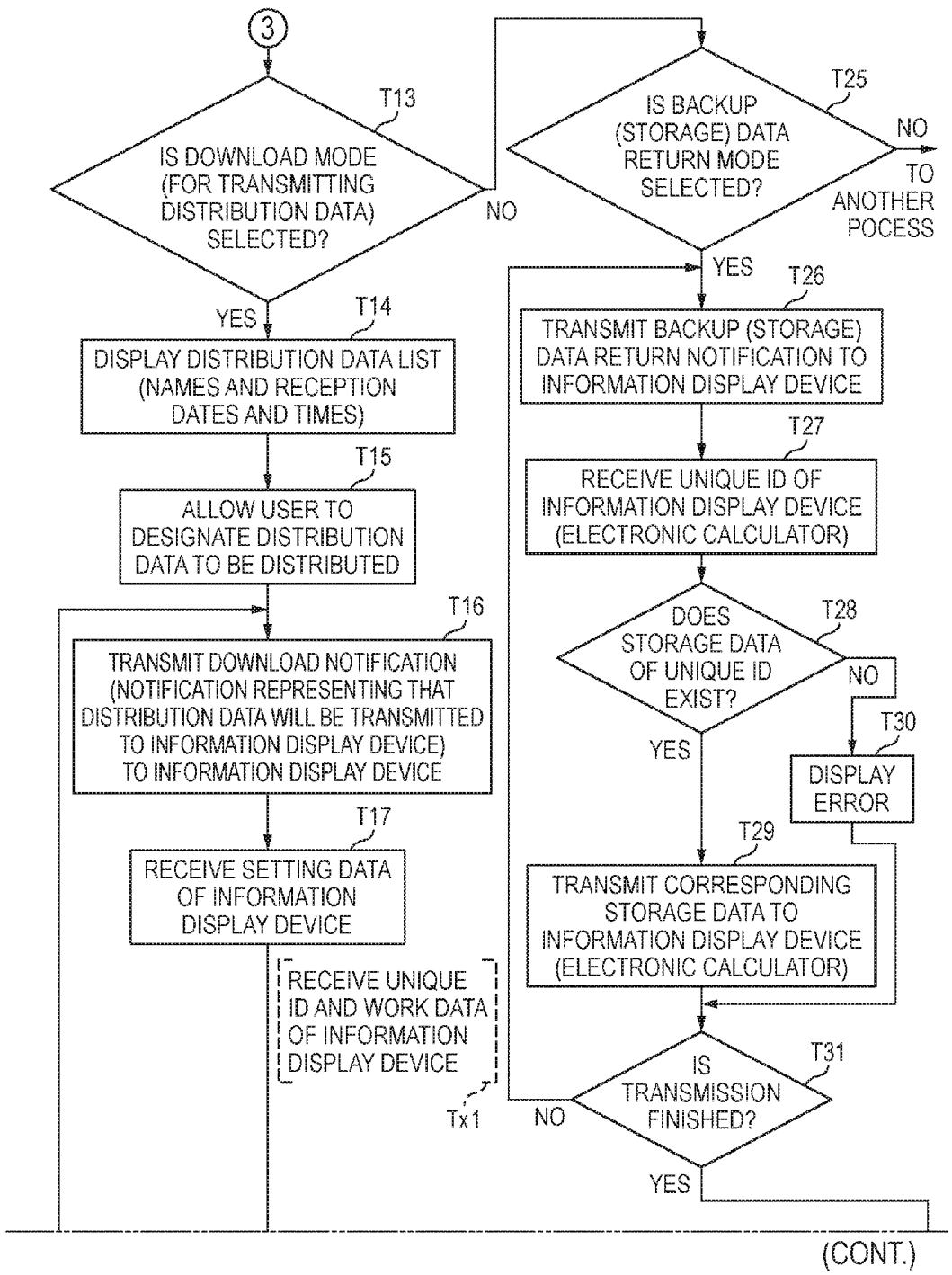
FIG. 8 is the other part of the communication process accommodating tray the dedicated application program of the tablet terminal 20.

FIGS. 7 and 8 are flow charts illustrating a part and the other part of a communication process according to the dedicated application program of the tablet terminal 20.

FIG. 9 is a view illustrating operation states of the scientific calculator 10F (a scientific calculator 10FA for a teacher) according to the information display control process when the scientific calculator is in the numerical table calculation mode.

Here, an operation in which the teacher generates educational work data with the scientific calculator (an information display device) 10FA for the teacher, and uploads the generated work data, as a distribution data item to be distributed to a scientific calculator 10FB (an information display device) for a student (to be described below), to the tablet terminal (the communication device) 20 will be described.

If the teacher operates a "SHIFT"+"SET UP" key of the scientific calculator 10FA for the teacher, a mode setting menu screen Gm is displayed as shown in (A1) of FIG. 9. When the menu screen Gm is displayed, the teacher operates a "3" key, whereby a screen Gk for setting the number of digits for display (a rounding mode) is displayed as shown in (A2) of FIG. 9. In this state, if teacher operates "1" key, thereby designating a "Fix" mode for setting the number of decimal places, and selects "3" as the number of decimal places, basic setting data including data on the rounding mode (in which the number of decimal places is 3), the display mode (the mathematical natural display mode set as a default display mode), and the angle mode (the degree (D) mode set as a default angle mode) is set, and is stored in the setting data area 14c (STEP S1).

If the numerical table calculation mode is set as the calculation mode, data on the set calculation mode (the numerical table calculation mode) is also stored in the setting data area 14c (STEP S2).

Thereafter, if the teacher inputs function expressions "f(x)=sin (x)" and "g(x)=cos (x)" as shown in (A3) and (A4) of FIG. 9, and inputs a calculation range from 0 to 360 and a step value "30" for numerical table calculation, such that display is performed as shown in (A5) of FIG. 9 (STEPS S3 TO S5), the function expressions and the range and step value for numerical table calculation are stored in the input data area 14d.

In this state, if the teacher operates an "=" key, whereby calculation based on the setting data stored in the setting data area 14c and the input data stored in the input data area 14d is performed ("Yes" in STEP S7), calculation result data on the numerical values of "f(x)" and "g(x)" calculated at intervals of the step value in the numerical table calculation range is displayed as a table on the display output unit 12 as shown in (A6) of FIG. 9 (STEP S8). With reference to FIG. 6 illustrating the communication interruption process to be described below, in the state where the scientific calculator 10FA for the teacher displays the setting data, the input data, and the calculation result data obtained by calculation, if it receives an upload notification from the tablet terminal 20 ("Yes" in STEP D1), it transmits QR data (composed of the unique ID and the work data) set as communication data of the wireless communication unit 16, as a distribution data item, to the tablet terminal 20 (STEP D2). In this way, the work data including the setting data, the input data, and the calculation result data obtained by calculation of the scientific calculator 10FA for the teacher can be backed up, as a distribution data item for the scientific calculator 10FB for the student to be described below, to the tablet terminal 20.

Also, if the teacher operates the "QR/communication" key 11Q as shown in (A7) of FIG. 9, the unique ID and the work data of the scientific calculator 10FA for the teacher is stored as the QR data in the QR data area 14f (STEP S10).

Then, a two-dimensional code (QR code) Q corresponding to the QR data (composed of the unique ID and the work data) is generated, and is displayed on the display output unit 12 (STEP S11).

Also, after the scientific calculator sets the QR data (composed of the unique ID and the work data) as communication data of the wireless communication unit 16, it determines whether the QR data has been transmitted to the tablet terminal 20 having activated the dedicated application program (the education program 23c) (STEP S13).

At this time, on the display output unit 12 of the scientific calculator 10FA, a message mc "WIRELESS COMMUNICATION ALLOWED" representing a state where it is possible to transmit the QR data (composed of the unique ID and the work data) to the tablet terminal (the communication device) 20 may be displayed.

In a case where it is determined that the QR data (composed of the unique ID and the work data) set as the communication data in the wireless communication unit 16 has been transmitted to the tablet terminal 20 ("Yes" in STEP S13), the display output unit returns to the calculation result data display state shown in (A6) of FIG. 9 (STEP S8).

Meanwhile, for example, even in a case where the tablet terminal 20 acquires the QR data (composed of the unique ID and the work data) which is the data on the two-dimensional code Q shown in (A7) of FIG. 9 by acquiring an image of the two-dimensional code (QR code) Q by the camera unit 26 of the tablet terminal 20, and then the teacher re-operates the "QR/communication" key 11Q of the scientific calculator 10FA, or operates then "AC" key, the display output unit returns to the calculation result data display state shown in (A6) of FIG. 9 (STEP S8).

Meanwhile, in a case where the teacher sets the statistical calculation mode as the calculation mode and inputs numerical values to be statistically calculated, and operates the "QR/communication" key 11Q in a state where the input numerical values are displayed (STEPS S1 to S5, and "Yes" in STEP S6), work data including the unique ID of the scientific calculator 10FA, the setting data for the statistical calculation mode, and the input data is stored and held as QR data in the QR data area 14f (STEP S12).

Thereafter, as described above, a two-dimensional code (QR code) Q corresponding to the QR data (composed of the unique ID and the work data) is generated, and is displayed on the display output unit 12 (STEP S11).

In a case where it is determined that the QR data (composed of the unique ID and the work data) set as communication data in the wireless communication unit 16 in the statistical calculation mode has been transmitted to the tablet terminal 20 ("Yes" in STEP S13), or the teacher re-operates the "QR/communication" key 11Q or operates the "AC" key ("Yes" in STEP S14), the display output unit returns to the state where it displays the input numerical values for statistical calculation (STEP S5).

After the two-dimensional code (QR code) Q including the work data obtained by calculation of the scientific calculator 10FA for the teacher in the numerical table calculation mode is displayed, and the data (QR data) on the two-dimensional code Q is set as communication data of the wireless communication unit 16 as shown in (A1) to (A7) of FIG. 9, as shown in (B1) of FIG. 9, if an education icon Ce displayed on a dedicated application selection screen Ge of the tablet terminal 20 is touched, the dedicated application program (the education program 23c) is activated.

Then, in the tablet terminal 20, a communication process shown in FIGS. 7 and 8 starts, and a mode selection menu (not shown in the drawings) which is a list of options "UPLOAD MODE", "DOWNLOAD MODE", and "BACKUP DATA RETURN MODE" is displayed (STEPS T1, T13, and T25).

The upload mode is a mode for requesting the scientific calculator 10FA to upload work data obtained by calculation to the tablet terminal 20 and receiving and storing the work data as distribution data items ((uploading (UP) of the scientific calculator).

The download mode is a mode for receiving and storing work data obtained by calculation of the scientific calculator 10FB (to be described below), as storage data items, in the upload mode, when needed, and then transmitting (distributing) distribution data items to the scientific calculator 10FB.

The backup data return mode is a mode for transmitting (returning) storage data items stored in the download mode to the scientific calculator 10FB for the student.

If the option "UPLOAD MODE" is selected in the mode selection menu displayed on the tablet terminal 20 as described above, and the tablet terminal 20 is brought close to the scientific calculator 10FA for the teacher such that a communication connection is established between them ("Yes" in STEP T1), the tablet terminal 20 transmits an upload notification (a notification for requesting the scientific calculator 10FA to transit work data as distribution data items) to the scientific calculator 10FA for the teacher (STEP T2).

If the scientific calculator 10FA for the teacher receives the upload notification from the tablet terminal 20 ("Yes" in STEP D1), the QR data (composed of the unique ID and the work data) set as communication data of the wireless communication unit 16 is transmitted as a distribution data item to the tablet terminal 20 (STEP D2).

If the tablet terminal 20 receives the QR data (composed of the unique ID and the work data) from the scientific calculator 10FA for the teacher (STEP T3), it displays a reception completion message m, and determines whether the user name corresponding to the unique ID received from the scientific calculator 10FA has been already registered in the memory 23 (STEP T4).

In a case of determining that the user name corresponding to the unique ID of the scientific calculator 10FA for the teacher has not been registered in the memory 23 ("No" in STEP T4), if a name (for example, "Teacher Mariko") is input by user's operations, the input name is registered as the user name of the scientific calculator 10FA for the teacher in the memory 23 in association with the unique ID of the scientific calculator 10FA (STEPS T5 and T6).

Then, in association with the unique ID received from the scientific calculator 10FA for the teacher, the user name, and the reception date and time, the received work data is stored and held as a distribution data item in the backup data area 23d (STEP T7).

Also, the backup data area 23d may be secured in a memory area of the compute server 30 provided on the communication network (Web) N.

If the work data received from the scientific calculator 10FA for the teacher is stored as a distribution data item in the backup data area 23d as described above, a backup data list LB including distribution data items stored in the backup data area 23d is displayed in association with user names and reception dates and times as shown in (B3) of FIG. 9 (STEP T8).

In this state, if any distribution data item is designated as a desired content check object from the displayed backup data list LB including the distribution data items stored in the backup data area 23d ("Yes" in STEP T9), the designated distribution data item is transmitted from the wireless communication unit 27 to the compute server 30 provided on the communication network (Web) N (STEP T10).

Then, on the basis of the content of the distribution data item, that is, the work data of the scientific calculator 10FA for the teacher (here, the work data including the setting data, the input data, the calculation result data obtained by calculating the function expressions "f(x)" and "g(x)" (see (A1) to (A6) of FIG. 9) in the numerical table calculation mode), the compute server 30 generates image data (here, data on an image including an upper input/output screen Gio showing the function expressions "f(x)=sin (x)" and "g(x)=cos (x)" and a lower graph screen Gg based on the calculation result) as calculation reference information, and transmits the image data to the tablet terminal 20, and the tablet terminal displays the image data on the display output unit 21 as shown in (B4) of FIG. 9 (STEP T11).

In this case, whenever any one distribution data item or storage data item displayed in the backup data list LB is designated, the compute server 30 generates image data as calculation reference information based on the content of the designated distribution data item or storage data item, and the tablet terminal 20 receives and displays the generated image data (STEPS T9 to T12).

In this way, it is possible to easily check the contents of the distribution data items stored in the backup data area 23d, using the compute server 30, and it is possible to accurately designate a distribution data item to be distributed to the scientific calculator 10FB for the student (to be described below).

Figure 10:
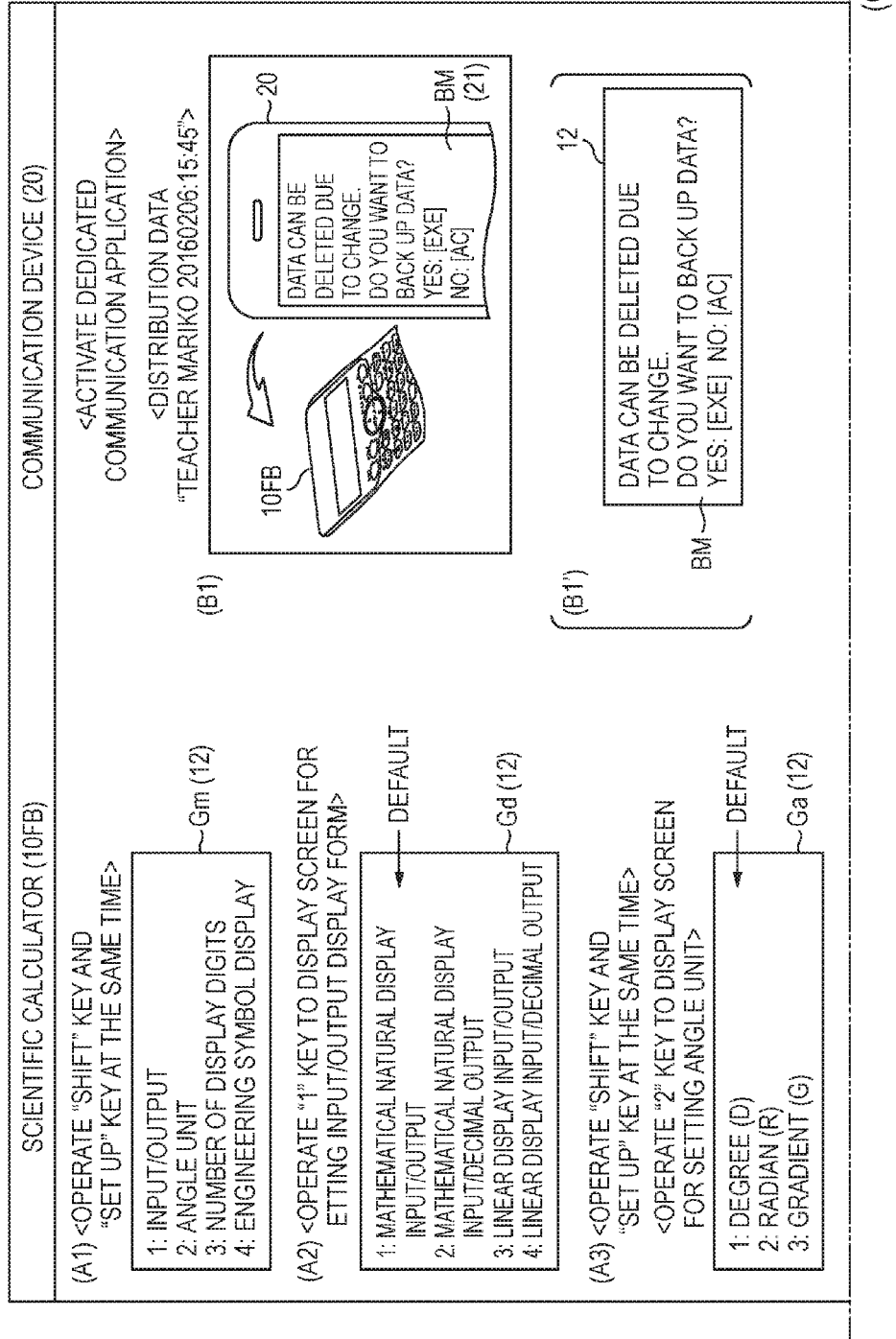
FIG. 10 is a view illustrating operation states of the scientific calculator 10F (a scientific calculator 10FB for a student) and operation states of the tablet terminal 20 according to the information display control process when the scientific calculator is in a basic calculation mode.

FIG. 10 is a view illustrating operation states of the scientific calculator 10F (the scientific calculator 10FB for the student) and operation states of the tablet terminal 20 according to the information display control process when the scientific calculator in the basic calculation mode.

In a case of distributing the distribution data item stored in the tablet terminal (the communication device) 20 to the scientific calculator (an information display device) 10FB for the student, work data obtained by calculation of the scientific calculator 10FB for the student is backed up to the tablet terminal 20, and then the distribution data item is distributed to the scientific calculator 10FB for the student (downloading (DN) of the scientific calculator). Hereinafter, this operation will be described.

In the scientific calculator 10FB for the student, if an option "1: INPUT/OUTPUT" is selected in the mode setting menu screen Gm shown in (A1) of FIG. 10, a display mode setting screen Gd is displayed as shown in (A2) of FIG. 10. In this state, a default display mode "1: MATHEMATICAL NATURAL DISPLAY INPUT/OUTPUT" is set. Also, if an option "2: ANGLE UNIT" is selected from the mode setting menu screen Gm as shown in (A3) of FIG. 10, an angle mode setting screen Ga is displayed. In this state, an option "2: RADIAN (R)", whereby the angle mode "R" (Radian) is selected. Then, setting data including data on the display mode "MATHEMATICAL NATURAL DISPLAY INPUT/OUTPUT" and the angle mode "R" is stored in the setting data area 14c (STEP S1).

Thereafter, if the student sets the basic calculation mode, and inputs a numerical value "2" as a variable "A" as shown in (A4) of FIG. 10, and inputs an integral calculation expression "∫(0−π/2A) cos (Ax)dx", display is performed as shown in (A5) of FIG. 10. The setting data of the calculation mode "BASIC CALCULATION MODE" is stored in the setting data area 14c, and the numerical value "2" input as the variable "A", and the integral calculation expression "∫(0−π/2A) cos (Ax)dx" are stored in the input data area 14d (STEPS S2 to S5).

In this state, if the student operates the "=" key, whereby calculation based on the setting data stored in the setting data area 14c and the input data stored in the input data area 14d is performed ("Yes" in STEP S7), calculation result data "1/2" obtained by plugging the numerical value "2" as the variable "A" in the integral calculation expression is displayed on the display output unit 12 (STEP S8).

Also, if an operation key for deleting the displayed work data from the display, that is, the "AC" key is operated, the displayed data (here, the integral calculation expression and the calculation result data (see (A5) of FIG. 10) is immediately deleted as shown in (A6) FIG. 10. Even in this case, the scientific calculator holds the work data including the setting data and input data related to the deleted data, using the setting data area 14c and the input data area 14d as a replay buffer, until new next data is input.

For this reason, after the display is deleted by the "AC" key, as shown in (A7) of FIG. 10, if a cursor key "l" 114 is operated, whereby a reply instruction is issued, the integral calculation expression is restored on the basis of the setting data and the input data held in the data areas 14c and 14d, and is redisplayed. In this state, if the "=" key is operated, calculation is performed again, whereby the calculation result "1/2" is displayed. Meanwhile, with reference to FIG. 6 illustrating the communication interruption process to be described below, in the state where the scientific calculator 10FA for the teacher displays the setting data, the input data, and the calculation result data obtained by calculation, if it receives an upload notification from the tablet terminal 20 ("Yes" in STEP D1), it transmits QR data (composed of the unique ID and the work data) set as communication data of the wireless communication unit 16, as a distribution data item, to the tablet terminal 20 (STEP D2). In this way, the work data including the setting data, the input data, and the calculation result data obtained by calculation of the scientific calculator 10FA for the teacher can be backed up, as a distribution data item related to the scientific calculator 10FB for the student to be described below, to the tablet terminal 20. Also, after display of first work data is deleted by a display deleting unit, if a second work data transmission notification is received, the first work data stored in the memory may be transmitted to the communication device, regardless of whether first setting data included in the first drive mechanism is different from second setting data included in the second work data. According to this configuration, after the user operates the "AC" key which is the operation key for deleting displayed work data from the display, whereby the work data is deleted, it is possible to surely store the work data of the information display device (the scientific calculator) in the communication device by communication, regardless of whether the first setting data of the work data and the second setting data are different from each other. Also, after the user operates the "AC" key which is the operation key for deleting the displayed work data from the display, the information display device may transit operation correspondence data according to the display deleting operation, and the first work data, to the communication device by communication with the communication device. In this case, the communication device receives the operation correspondence data (forced-storage instruction data) based on the display deleting operation on the information display device and the first work data including the first setting data, from the information display device having the first work data from the information display device. If the operation correspondence data (forced-storage instruction data) is received, the communication device can register the first work data as a storage data item in the memory, regardless of whether the first setting data and the second setting data are different from each other, or not.

Also, as shown in (A7') of FIG. 10, if the "QR/communication" key 11Q is operated ("Yes" in STEP S9), similarly in the case of performing calculation by the scientific calculator 10FA for the teacher, the work data including the unique ID of the scientific calculator 10FB for the student, the setting data, the input data, and the calculation result data is stored and held as QR data in the QR data area 14f (STEP S10).

Then, a two-dimensional code (QR code) Q corresponding to the QR data (composed of the unique ID and the work data) is generated, and is displayed (STEP S11).

Also, after the scientific calculator sets the QR data (composed of the unique ID and the work data) as communication data of the wireless communication unit 16, it determines whether the QR data has been transmitted to the tablet terminal 20 having activated the dedicated application program (the education program 23c) (STEP S13).

As described above, in the procedure of the calculation process of the scientific calculator 10FB for the student, a distribution data item stored in the tablet terminal 20 is distributed to the scientific calculator 10FB for the student such that the student can lean the distribution data item. To this end, in the tablet terminal 20, the dedicated application program (the education program 23c) is activated, whereby the mode selection menu including the options "UPLOAD MODE", "DOWNLOAD MODE", and "BACKUP DATA RETURN MODE" (not shown in the drawings) is displayed on the display output unit 21. In this state, the option "DOWNLOAD MODE" is selected ("Yes" in STEP S13).

Then, the list of the distribution data items stored in the backup data area 23d is displayed as the backup data list LB on the display output unit 21, for example, as shown in (B3) of FIG. 9 described above (STEP T14).

After the distribution data item (here, the distribution data item of the teacher "Mariko") to be distributed to the scientific calculator 10FB for the student is designated from the distribution data items displayed as the backup data list LB, the tablet terminal 20 is brought close to the tablet terminal 20 as shown in (B1) of FIG. 10, such that a communication connection is established between them (STEP T15).

Then, the tablet terminal 20 transmits a download notification (a notification representing that it will transmit the distribution data item to the scientific calculator 10FB for the student) to the scientific calculator 10FB for the student (STEP T16).

If the scientific calculator 10FB for the student receives the download notification from the tablet terminal 20 ("Yes" in STEP D3), the setting data based on the state of the current calculation process and stored in the setting data area 14c is transmitted to the tablet terminal 20 (STEP D4).

If the tablet terminal 20 receives the setting data from the scientific calculator 10FB for the student (STEP T17), it determines whether the setting data received from the scientific calculator 10FB for the student and the setting data included in the distribution data item (the work data generated by the scientific calculator 10FA for the teacher) designated from the backup data list LB are the same as each other or not (they are different from each other) (STEP T18).

In a case of determining that the setting data of the scientific calculator 10FB for the student and the setting data included in the designated distribution data item are different from each other ("No" in STEP T18), in order to prevent the work data based on the setting data of the scientific calculator 10FB for the student from being lost by change, as shown in (B1) of FIG. 10, a data storage message BM "DO YOU WANT TO BACK UP DATA? YES: [EXE] NO: [AC]" urging the user to back up the current work data of the scientific calculator 10FB for the student is displayed on the display output unit 21 (STEP T19).

If the user touches an "EXE" key (YES) according to the data storage message BM, thereby designating storage of the work data ("Yes" in STEP T19), the tablet terminal transmits a backup notification (a notification requesting the scientific calculator 10FB to transmit the work data to be backed up (stored)) to the scientific calculator 10FB for the student (STEP T20).

If the scientific calculator 10FB for the student receives the backup notification from the tablet terminal 20 ("Yes" in STEP D5), it transmits the work data including the unique ID of the scientific calculator 10FB, and the setting data, the input data, and the calculation result data according to the state of the current calculation process and stored in the data areas 14c, 14d, and 14e, to the tablet terminal 20 (STEP D6).

If the tablet terminal 20 receives the unique ID and the work data from the scientific calculator 10FB for the student (STEP T21), it displays the reception completion message m, and stores and holds the received work data as a storage data item in the backup data area 23d in association with the received unique ID and the reception date and time (STEP T22).

Thereafter, the tablet terminal reads the distribution data item (here, the distribution data item of the teacher "Mariko") designated from the backup data list LB (see (B3) of FIG. 9) in STEPS S14 and S15, from the backup data area 23d, and transmits the read distribution data item to the scientific calculator 10FB for the student (STEP T23).

Meanwhile, in a case of determining in STEP T18 that the setting data of the scientific calculator 10FB for the student and the setting data included in the designated distribution data item are the same as each other ("Yes" in STEP S18), the tablet terminal reads the designated distribution data item from the backup data area 23d, and transmits the designated distribution data item to the scientific calculator 10FB for the student (STEP T23), without backing up the current work data of the scientific calculator 10FB for the student (STEPS T19 to T22).

Meanwhile, if the scientific calculator 10FB for the student receives the download notification from the tablet terminal 20 ("Yes" in STEP D3), it transmits the setting data stored in the setting data area 14c to the tablet terminal 20 (STEP D4). If where the tablet terminal 20 determines that the setting data received from the scientific calculator 10FB is different from the setting data included in the distribution data item designated from the backup data list LB ("No" in STEP T18), it receives the work data transmitted from the scientific calculator 10FB for the student in STEPS D5 and D6 (STEP T21), and stores the received work data as a storage data item (STEP T22), without transmitting the backup notification to the scientific calculator 10FB for the student (STEPS T19 and T20).

In this case, as shown by a dashed arrow in FIG. 6, if the scientific calculator 10FB for the student receives the download notification from the tablet terminal 20 ("Yes" in STEP D3), it transmits the unique ID and the work data to the tablet terminal 20 (STEP D6), without performing the process of transmitting the setting data (STEP D4). Then, immediately after transmitting the download notification to the scientific calculator 10FB for the student (STEP T16), the tablet terminal 20 receives the unique ID and the work data from the scientific calculator 10FB for the student (STEP Tx1). In a case where the setting data included in the received work data is different from the setting data included in the distribution data item designated from the backup data list LB ("No" in STEP T18), the tablet terminal stores the unique ID and the work data as a storage data item without change (STEPS T19, Tx2, and Tx22). In a case where the setting data included in the received work data is different from the setting data included in the designated distribution data item ("Yes" in STEP T18), the tablet terminal may discard the unique ID and the work data received, and transmit the distribution data item designated from the backup data list LB to the scientific calculator 10FB for the student (STEP T23).

Also, in the case where the setting data received from the scientific calculator 10FB for the student is different from the setting data included in the distribution data item designated from the backup data list LB ("No" in STEP T18), as shown in (B1) of FIG. 10, the tablet terminal 20 may display the data storage message BM urging the user to back up the current work data of the scientific calculator 10FB for the student, on the display output unit 21 (STEP T19).

In this case, the tablet terminal 20 first transmits only the setting data included in the designated distribution data item to the scientific calculator 10FB for the student. In this case, if the scientific calculator 10FB for the student determines that the setting data included in the distribution data item and received from the tablet terminal 20 is different from the setting data stored in the setting data area 14c of the scientific calculator 10FB for the student, as shown in (B1') of FIG. 10, it may display the data storage message BM urging the user to back up the current work data of the scientific calculator 10FB for the student, on the display output unit 12, and transmit the corresponding work data to the tablet terminal 20.

If the scientific calculator 10FB for the student receives the distribution data item (here, the distribution data item of the teacher "Mariko") transmitted from the tablet terminal 20, it sets the setting data, the input data, and the calculation result data included in the received distribution data item, that is, the work data obtained in the numerical table calculation mode, in the setting data area 14c, the input data area 14d, and the calculation result data area 14e, respectively (STEP D7).

Thereafter, on the basis of the work data which is the distribution data item set in the data areas 14c to 14e, the scientific calculator 10FB transitions to the numerical table calculation mode according to the work data, and displays the calculation expressions and the calculation result data corresponding to the work data as a down screen DNe on the display output unit 12 as shown in (B2) of FIG. 10 (STEP D8).

Thereafter, in a case of distributing the distribution data item to another scientific calculator 10FB for a student ("No" in STEP T24), the tablet terminal 20 repeatedly performs the processes of STEPS T16 to T23 (STEPS D3 to D8).

Therefore, even in a case where the scientific calculator 10FB for the student has limited small memory, it can easily download educational work data prepared by performing a calculation process in the scientific calculator 10FA for the teacher, as a distribution data item, from the tablet terminal 20, without losing any work data obtained by performing a calculation process in the scientific calculator 10FB, and use the downloaded work data.

Also, according to the above-described embodiment, the first setting data of the first work data of the scientific calculator for the student which is the information display device is transmitted to the tablet terminal 20 which is the communication device, and the communication device determines whether the received first setting data and the setting data of the distribution data item are different from each other, or not.

However, the communication device may transmit only the setting data of the distribution data item to the information display device before transmitting the distribution data item to the information display device, and the information display device may determine whether the first setting data is different from the setting data of the distribution data item, or not. Also, in other cases, the information display device may back up the first work data to the communication device.

As described above, after the work data prepared in the scientific calculator 10FA for the teacher is downloaded as a distribution data item from the tablet terminal 20 to the scientific calculator 10FB for the student (downloading (DN)) such that it is possible to learn the work data, in order to return the storage data item backed up to the tablet terminal 20 to the scientific calculator 10FB for the student, the option "BACKUP DATA RETURN MODE" is selected in the mode selection menu including the options "UPLOAD MODE", "DOWNLOAD MODE", and "BACKUP DATA RETURN MODE" (not shown in the drawings) and displayed on the display output unit 21 of the tablet terminal 20 by activation of the dedicated application program (the education program 23c) in the tablet terminal 20 ("Yes" in STEP T25).

Thereafter, if the tablet terminal 20 is brought close to the scientific calculator 10FB for the student as shown in (B3) of FIG. 10, whereby establishing a communication connection therebetween, the backup (storage) data return notification is transmitted from the tablet terminal to the scientific calculator 10FB for the student (STEP T26)

If the scientific calculator 10FB for the student receives the backup (storage) data return notification from the tablet terminal 20 ("Yes" in STEP D9), it transmits the unique ID of the scientific calculator 10FB to the tablet terminal 20 (STEP D10).

If the tablet terminal 20 receives the unique ID transmitted from the scientific calculator 10FB for the student (STEP T27), it determines whether there is any storage data item stored in the backup data area 23d in association with the corresponding unique ID (STEP T28).

In a case of determining that whether there is a storage data item stored in the backup data area 23d in association with the unique ID of the scientific calculator 10FB for the student ("Yes" in STEP T28), a data return message RM "DO YOU WANT TO RETURN DATA? YES: [EXE] NO: [AC]" urging the user to return the storage data item is displayed on the display output unit 21.

Then, if an "EXE" key (YES) is touched according to the data storage message BM, whereby returning of the storage data item is designated, the tablet terminal transmits a notification representing that there is the storage data item, to the scientific calculator 10FB for the student, and reads the storage data item stored in the backup data area 23d in association with the unique ID of the scientific calculator 10FB for the student, and transmits the storage data item to the scientific calculator 10FB for the student (STEP T29).

Meanwhile, in a case of determining in STEP T28 that there is no storage data item stored in the backup data area 23d in association with the unique ID of the scientific calculator 10FB for the student ("No" in STEP T28), an error message is displayed to notify that there is no storage data item stored (STEP T30).

Also, in the case where the tablet terminal 20 determines that there is a storage data item stored in the backup data area 23d in association with the unique ID received from the scientific calculator 10FB for the student ("Yes" in STEP T28), it displays the data return message RM urging the user to return the corresponding storage data item, on the display output unit 21, as shown in (B3) of FIG. 10.

In this case, the tablet terminal first transmits the unique ID associated with the storage data item stored in the backup data area 23d to the scientific calculator 10FB for the student. In this case, if the scientific calculator 10FB for the student determines that the unique ID received from the tablet terminal 20 is the same as the unique ID of the scientific calculator 10FB, it may display the data return message RM urging the student to return the storage data item, on the display output unit 12, as shown in (B3') of FIG. 10, and request the tablet terminal 20 to transmit the storage data item.

If the scientific calculator 10FB for the student receives the storage data item (here, the work data of the integral calculation performed in the basic calculation mode as shown in (A1) to (A7) of FIG. 10) transmitted from the tablet terminal 20, the setting data, the input data, and the calculation result data included in the received storage data item, that is, the work data obtained in the basic calculation mode are set in the setting data area 14c, the input data area 14d, and the calculation result data area 14e, respectively (STEP D12).

Then, on the basis of the work data which is the storage data item set in the data areas 14c to 14e, the scientific calculator 10FB transitions to the basic calculation mode based on the work data, and displays the integral calculation expression and the calculation result data corresponding to the work data, as a return screen DNb, on the display output unit 12 as shown in (B4) of FIG. 10 (STEP D13).

Thereafter, in a case where the tablet terminal 20 returns a backup (storage) data item to another scientific calculator 10FB for a student ("No" in STEP T31), it repeatedly performs the processes of STEPS T26 to T30 (STEPS D9 to D13) described above.

In this way, when the student learns work data prepared by performing a calculation process in the scientific calculator 10FA for the teacher, the student can easily and properly back up (store) work data obtained by performing a calculation process in the scientific calculator 10FB for the student, to (in) the tablet terminal 20, and thereafter request the tablet terminal to return the stored work data to the scientific calculator 10FB for the student, thereby restoring the work data.

Also, in the scientific calculator 10FB for the student, if the display of some data is deleted as shown in (A6) of FIG. 10 due to an operation on the "AC" key, work data including setting data and input data related to the deleted data is backed up to the setting data area 14c and the input data area 14d acting as replay buffers, when next data is not input.

Therefore, after the display is deleted by the operation on the "AC" key, if a communication connection is established between the scientific calculator 10FB and the tablet terminal 20 set in the download mode, as described above, the scientific calculator transmits work data including its unique ID, and the setting data and the input data according to the state of the current calculation process and stored in the data areas 14c and 14d, to the tablet terminal 20 (STEPS D3 to D6), and the tablet terminal 20 stores the work data as a storage data item in the backup data area 23d (STEPS T13 to T22).

Therefore, if the tablet terminal 20 is set to the backup (storage) data return mode, and returns the storage data item to the scientific calculator 10FB for the student (STEPS T25 to T29), as described above, the scientific calculator 10FB for the student can restore the original work data and set the original work data in the setting data area 14c and the input data area 14d, and displays the calculation expression corresponding to the original work data as shown in (A7) of FIG. 10 (STEPS D9 to D13).

Therefore, according to the scientific calculator 10F and the tablet terminal 20 configured as the information display device and the communication device as described above, after the scientific calculator 10FA for the teacher performs a calculation process, thereby obtaining work data including setting data and input data, if a communication connection with the tablet terminal 20 set in the upload mode is established, it is possible to upload the work data of the scientific calculator 10FA for the teacher, as a distribution data item to be distributed to the scientific calculator 10FB for the student, to the tablet terminal 20.

Thereafter, the tablet terminal 20 is set to the download mode, and a communication connection is established between the tablet terminal and the scientific calculator 10FB for the student. At this time, if the setting data based on a calculation process of the scientific calculator 10FB for the student is different from the setting data included in the distribution data item stored in the tablet terminal 20, work data of the scientific calculator 10FB for the student including the setting data and input data is stored as a backup (storage) data item in the tablet terminal 20 in association with the unique ID. Thereafter, the distribution data item is downloaded to the scientific calculator 10FB for the student (downloading (DN)) such that it is possible to learn the work data which is the distribution data item. Meanwhile, if the setting data based on the calculation process of the scientific calculator 10FB for the student is the same as the setting data included in the distribution data item stored in the tablet terminal 20, the work data of the scientific calculator 10FB for the student is not backed up to (stored in) the tablet terminal, and the distribution data item is downloaded from the tablet terminal to the scientific calculator 10FB.

Therefore, it is possible to load educational work data prepared in the scientific calculator 10FA, to the scientific calculator 10FB for the student, without losing important work data related to a calculation process of the scientific calculator 10FB for the student, and learn the work data.

Therefore, even if the information display device such as the scientific calculator 10F has limited memory, it is possible to appropriately download new work data to the information display device and use the downloaded work data.

Also, according to the scientific calculator 10F and the tablet terminal 20 configured as the information display device and the communication device as described above, in a case where the tablet terminal 20 is set to the backup (storage) data return mode, and a communication connection between the tablet terminal and the scientific calculator 10FB for the student is established, if the tablet terminal 20 has a storage data item associated with the unique ID of the scientific calculator 10FB for the student having the communication connection, it returns the storage data item to the scientific calculator 10FB for the student.

Therefore, after the student learns work data prepared by the teacher with the scientific calculator 10FB for the student, it is possible to surely restore work data related to a calculation process performed before that learning.

All of the methods of the individual processes which are performed by the information display devices (10D, 10F, and 10FB) described in each embodiment, that is, the methods of the processes such as the information display control process shown in FIG. 5, the information display control process (the communication interruption process) shown by the flow chart of FIG. 6, and the computer program shown by the flow charts of FIGS. 7 and 8 can be configured as programs, which can be stored in recording media, such as memory cards (such as ROM cards and RAM cards), magnetic disks (such as floppy (registered as a trade mark) disks and hard disks), optical disks (such as CD-ROMs and DVDs), and semiconductor memories, to distributed. Also, program data for realizing the methods may be transmitted in a program code form on the communication network N, and the program data can be loaded into a computer which is an electronic apparatus is connected to the communication network N by a communication unit, thereby capable of realizing the work data uploading function, the work data downloading function, and the backup (storage) data returning function described above. Also, according to the above-described embodiment, work data for distribution is generated in the calculator of the teacher, and is transmitted to the tablet terminal by wireless communication, and is stored in the memory contained in the main body of the tablet terminal. However, work data for distribution may be stored in a database (a cloud server) provided on a network such that it is possible to temporarily download the work data to the tablet terminal, thereby using the work data if necessary. Also, educational work data may be stored, as data for distribution, in a database (a cloud server) provided on a network in advance, such that it is possible to download the educational work data from the database (the cloud server) provided on the network to the tablet terminal, thereby using the educational work data.

The present invention is not limited to the embodiments, and may have various modifications within the scope without departing from the spirit thereof at the time of carrying out the invention. In addition, the embodiments include inventions of various stages, and thus various inventions may be extracted by appropriate combinations of a plurality of disclosed constituent elements. For example, even if some constituent elements are deleted from all the constituent elements shown in the embodiments, or some constituent elements are combined in different forms, a configuration in which the constituent elements are deleted or combined may be extracted as an invention in a case of being capable of solving the problems described in the Problem that the Invention is to Solve and achieving the effects described in the Advantage of the Invention.

What is claimed is:

1. An information display device comprising:
    a wireless communication unit that is configured to perform wireless communication with a communication device;
    a memory; and
    a processor,
    wherein the memory stores first work data including first setting data,
    the processor is configured to perform operations including:
        receiving a transmission notification as a notification representing that the communication device having second work data including second setting data transmits the second work data, by the wireless communication unit; and
        transmitting the first work data stored in the memory to the communication device, according to the received transmission notification, in a case where the first setting data included in the first work data and the second setting data included in the second work data are different from each other.

2. The information display device according to claim 1, wherein:
    the processor is configured to further perform operations including:
    according to the received transmission notification,
        (i) receiving the second work data from the communication device after the transmitting process of the first work data in a case where the first setting data included in the first work data and the second setting data included in the second work data are different from each other; and
        (ii) receiving the second work data from the communication device, without transmitting the first work data stored in the memory in a case where the first setting data included in the first work data and the second setting data included in the second work data are the same as each other.

3. The information display device according to claim 2, wherein:
    the processor is configured to further perform operations including:
    in the transmitting process of the first work data, transmitting the first work data stored in the memory in association with identification information of the information display device, according to reception of the transmission notification in the transmitting process of the transmission notification;
    in the receiving process of the second work data, receiving the second work data from the communication device after the transmitting process of the first work data; and
    receiving the first work data associated with the identification information of the information display device, from the communication device after receiving the second work data from the communication device in the receiving process of the second work data.

4. The information display device according to claim 2, further comprising:
    a display,
    wherein the processor is configured to further perform operations including:
    displaying the first work data stored in the memory, on the display;
    deleting the first work data displayed on the display, from the display, according to a user's operation; and
    re-displaying the first work data stored in the memory, on the display, according to a user's operation after the first work data displayed on the display is deleted.

5. The information display device according to claim 1, wherein:
    the wireless communication unit includes a near field communication unit.

6. The information display device according to claim 1, further comprising:
    a display;
    wherein the processor is configured to further perform operations including:

displaying the first work data stored in the memory, on the display;

deleting the first work data displayed on the display, from the display, according to a display deleting operation of a user; and transmitting the first work data stored in the memory to the communication device, regardless of whether the first setting data included in the first work data and the second setting data included in the second work data are different from each other, when the transmission notification of the second work data is received in a case where the first work data is deleted according to the display deleting operation of the user.

7. A communication method of an information display device including a memory and a wireless communication unit configured to perform wireless communication with a communication device, wherein the memory stores first work data including first setting data, and the communication method comprises:

receiving a transmission notification as a notification representing that the communication device having second work data including second setting data transmits the second work data, by the wireless communication unit; and transmitting the stored first work data to the communication device, according to the received transmission notification, in a case where the first setting data included in the first work data and the second setting data included in the second work data are different from each other.

8. The communication method according to claim 7, further comprising:

according to the received transmission notification, (i) receiving the second work data from the communication device after the transmitting process of the first work data in a case where the first setting data included in the first work data and the second setting data included in the second work data are different from each other; and (ii) receiving the second work data from the communication device, without transmitting the first work data stored in the memory in a case where the first setting data included in the first work data and the second setting data included in the second work data are the same as each other.

9. The communication method according to claim 8, further comprising:

in the transmitting process of the first work data, transmitting the first work data stored in the memory in association with identification information of the information display device, according to reception of the transmission notification in the transmitting process of the transmission notification;

in the receiving process of the second work data, receiving the second work data from the communication device after the transmitting process of the first work data; and receiving the first work data associated with the identification information of the information display device, from the communication device after receiving the second work data from the communication device in the receiving process of the second work data.

10. The communication method according to claim 8, further comprising:

wherein the information display device includes a display, and wherein the communication method further comprises:

displaying the first work data stored in the memory, on the display;

deleting the first work data displayed on the display, from the display, according to a user's operation; and re-displaying the first work data stored in the memory, on the display, according to a user's operation after the first work data displayed on the display is deleted.

11. A non-transitory computer readable storage medium stored a program for controlling a computer of an information display device including a memory and a wireless communication unit configured to perform wireless communication with a communication device, wherein the memory stores first work data including first setting data, and the program causes the computer to perform operations comprising:

receiving a transmission notification as a notification representing that the communication device having second work data including second setting data transmits the second work data, by the wireless communication unit; and transmitting the first work data stored in the memory to the communication device, according to the received transmission notification, in a case where the first setting data included in the first work data and the second setting data included in the second work data are different from each other.

* * * * *